US011113470B2

(12) United States Patent
Nelson et al.

(10) Patent No.: US 11,113,470 B2
(45) Date of Patent: *Sep. 7, 2021

(54) PRESERVING AND PROCESSING AMBIGUITY IN NATURAL LANGUAGE

(71) Applicant: ACCENTURE GLOBAL SOLUTIONS LIMITED, Dublin (IE)

(72) Inventors: Paul Edward Nelson, Annapolis, MD (US); Mark Richard David, Campbell, CA (US); Esteban Alberto Alvarado Solano, San Jose (CR)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 30 days.

This patent is subject to a terminal disclaimer.

(21) Appl. No.: 16/694,721

(22) Filed: Nov. 25, 2019

(65) Prior Publication Data

US 2020/0089756 A1    Mar. 19, 2020

Related U.S. Application Data

(63) Continuation of application No. 16/183,305, filed on Nov. 7, 2018, now Pat. No. 10,528,664.

(Continued)

(51) Int. Cl.
*G06K 9/46* (2006.01)
*G06F 40/284* (2020.01)
(Continued)

(52) U.S. Cl.
CPC .......... *G06F 40/284* (2020.01); *G06F 40/211* (2020.01); *G06F 40/30* (2020.01);
(Continued)

(58) Field of Classification Search
CPC .......... G06F 40/30; G06F 40/35; G06K 9/469
See application file for complete search history.

(56) References Cited

U.S. PATENT DOCUMENTS

| 4,994,966 A | 2/1991 | Hutchins |
| 5,418,717 A | 5/1995 | Su et al. |

(Continued)

FOREIGN PATENT DOCUMENTS

| EP | 2184685 A1 * | 5/2010 | ............. G06F 40/55 |
| EP | 2184685 A1 | 5/2010 | |

(Continued)

OTHER PUBLICATIONS

Arab Meysam et al., "A graph-based approach to word sense disambiguation. An unsupervised method based on semantic relatedness", 2016 24th Iranian conference on Electrical Engineering (ICCE), May 10, 2016, pp. 250-255.

(Continued)

*Primary Examiner* — Feng-Tzer Tzeng
(74) *Attorney, Agent, or Firm* — Mannava & Kang, P.C.

(57) ABSTRACT

Examples for efficiently representing, processing and deciding amongst multiple ambiguous interpretations of human natural language text are described. Processing includes creating and augmenting an "interpretation graph" which represents all known ambiguous interpretations of some natural language text. The interpretation graph is made of vertices (junction points which lead to alternative interpretations) and 'lexical items' (natural language objects representing data blocks, tokens, word parts, phrases, clauses, parts of speech, entities, or semantic interpretations) that represent alternative ambiguous interpretations of portions of the text. The examples show a set of simple operations for augmenting the interpretation graph to create alternative interpretations. Finally, the method includes a notion of "confidence", which is computed as the graph is being constructed and can be used by a selector once the graph is complete to choose the most likely interpretation followed by any number of increasingly less likely interpretations. By (Continued)

saving all known ambiguous or alternative interpretations in an interpretation graph, the example system can provide better accuracy, reliability and coverage since possible alternatives are not pruned until the final end-to-end interpretation is selected.

20 Claims, 20 Drawing Sheets

Related U.S. Application Data

(60) Provisional application No. 62/585,336, filed on Nov. 13, 2017.

(51) Int. Cl.
*G06N 10/00* (2019.01)
*G06N 20/00* (2019.01)
*G06F 40/30* (2020.01)
*G06F 40/211* (2020.01)
*G06F 40/35* (2020.01)

(52) U.S. Cl.
CPC ............ *G06N 10/00* (2019.01); *G06N 20/00* (2019.01); *G06F 40/35* (2020.01); *G06K 9/469* (2013.01)

(56) References Cited

U.S. PATENT DOCUMENTS

| 5,490,061 | A | 2/1996 | Tolin |
| 6,598,018 | B1 | 7/2003 | Junqua |
| 6,631,346 | B1 | 10/2003 | Karaorman |
| 7,398,201 | B2 | 7/2008 | Marchisio |
| 9,053,089 | B2 | 6/2015 | Ballegarda |
| 9,361,587 | B2 | 6/2016 | Bounouane |
| 10,534,863 | B2 | 1/2020 | Song |
| 2003/0158723 | A1 | 8/2003 | Masuichi |
| 2004/0049375 | A1 | 3/2004 | Britten |
| 2004/0090439 | A1* | 5/2004 | Dillner ............... G06K 9/00402 345/440 |
| 2007/0016401 | A1 | 1/2007 | Ehsani |
| 2007/0192085 | A1 | 8/2007 | Roulland |
| 2008/0071800 | A1 | 3/2008 | Neogi |
| 2008/0091408 | A1 | 4/2008 | Roulland |
| 2008/0104032 | A1 | 5/2008 | Sarkar |
| 2009/0089058 | A1 | 4/2009 | Ballegarda |
| 2009/0216884 | A1 | 8/2009 | Larvet |
| 2010/0262576 | A1 | 10/2010 | Stockwell et al. |
| 2014/0250047 | A1 | 9/2014 | Bounouane |
| 2015/0066477 | A1 | 3/2015 | Hu |
| 2015/0088484 | A1 | 3/2015 | Bostick |
| 2015/0277900 | A1 | 10/2015 | O'Keeffe et al. |
| 2017/0199928 | A1 | 7/2017 | Zhao |
| 2017/0357625 | A1 | 12/2017 | Carpenter |
| 2018/0089572 | A1 | 3/2018 | Aili et al. |
| 2018/0157642 | A1 | 6/2018 | Matskevich |
| 2018/0225281 | A1 | 8/2018 | Song |
| 2018/0260385 | A1 | 9/2018 | Fan |
| 2018/0373507 | A1 | 12/2018 | Mizrahi |

FOREIGN PATENT DOCUMENTS

| EP | 2953037 A1 * | 12/2015 | ............ G06F 40/35 |
| EP | 2953037 A1 | 12/2015 | |
| WO | 97/48058 A1 | 12/1997 | |
| WO | 2016/044321 A1 | 3/2016 | |

OTHER PUBLICATIONS

Rada Mihalcea, "Unsupervised large-vocabulary word sense disambiguation with graph-based algorithms for sequence data labeling", Human Language Technology and Empirical Methods in Natural Language Processing, Association for Computational Linguistics, Stroudsburg, Pennsylvania, Oct. 6, 2005, pp. 411-418.

* cited by examiner

PRESERVING AND PROCESSING AMBIGUITY IN NATURAL LANGUAGE

PRIORITY

The present application is a Continuation of commonly assigned and co-pending U.S. patent application Ser. No. 16/183,305 filed on Nov. 7, 2018, which claims priority from U.S. Provisional Application Ser. No. 62/585,336 filed on Nov. 13, 2017, the disclosures of which are incorporated by reference in their entireties.

BACKGROUND

Natural language processing involves processing of a natural language input. A natural language input may be understood as a human language used by a person to interact with a computing system. An example of the natural language input may be "A Raven gave me a punch". As can be understood, each word or phrase in this sentence may have different alternative interpretations, which make meaning of the input ambiguous. For example, "A Raven" can be a bird, a football player, or a person with raven-colored hair. Further, "me" can be an object form of the pronoun 'I' or "me" may also refer to "Medical Emergency", "Medical Examiner", or "Mechanical Engineer". Likewise, "punch" could mean a hit in the mouth, a type of drink, or a device to make holes in an object. Also, "give" could be an act of property transfer, and act of labeling, or a physical action, depending on the precise meaning of "raven" and "punch".

The computing system may attempt to take an action based on the natural language input. However, in order to do so, the computing system must determine the precise meaning of the natural language input such that the natural language input can be understood and acted upon by the computing system. In order to be successful, the computing system must understand the question precisely enough to identify specific data records (for example, representing a person, action or product) to operate upon. Further, when such precision is not possible (due, for example, to ambiguous statements by the human) the computing system must be able to understand that the input is ambiguous, understand the alternative interpretations and allow for methods for resolving the ambiguity using methods such as statistical or probabilistic analysis, machine learning, confidence analysis or simply asking a human user to resolve the ambiguity.

Various natural language processing systems have been developed in the past. However, such natural language processing systems lack intelligence and a technically advanced framework for representing, managing, and selecting from ambiguous interpretations in a natural language input. This is because, in existing systems, alternative interpretations of words are pruned at every step. For example, for the natural language input "The Raven gave me a punch", the conventional natural language processing systems make a fixed choice for each word at an initial stage, and thus discard a range of possible interpretations.

For example, available techniques may lower-case all words. For instance, "Raven" in the example above, may be converted to "raven", thereby discarding the Title-case version of the word. As a result, the likelihood that "Raven" can refer to a member of the Raven's football team, i.e., a proper noun, is reduced or eliminated. Such simplifications may occur at various levels in available tools. For instance, simplifications with respect to word classification (e.g. punch as a verb vs. punch as a noun), syntax (attachment of phrases) and semantics (semantic interpretations). Such simplifications and pruning are cumulative, which in turn may reduce the accuracy and coverage of available natural language processing tools and may prevent such tools from being able to represent the entire range of human language richness.

Owing to the elimination of possible interpretations at an early state, the ability of available natural language processing systems to determine the appropriate interpretation of the natural language input may be significantly reduced. Therefore, because all the alternative interpretations are not taken into consideration while processing the natural language input, existing natural language processing systems may not correctly understand the natural language input. Accordingly, a technical problem with the currently available natural language processing systems is that they may be inefficient, inaccurate, incomplete, and unreliable.

BRIEF DESCRIPTION OF DRAWINGS

Features of the present disclosure are illustrated by way of examples shown in the following figures. In the following figures, like numerals indicate like elements, in which:

FIGS. 3A-3M illustrate various stages of processing of a data block by the system, according to an example embodiment of the present disclosure;

DETAILED DESCRIPTION

Figure 1:
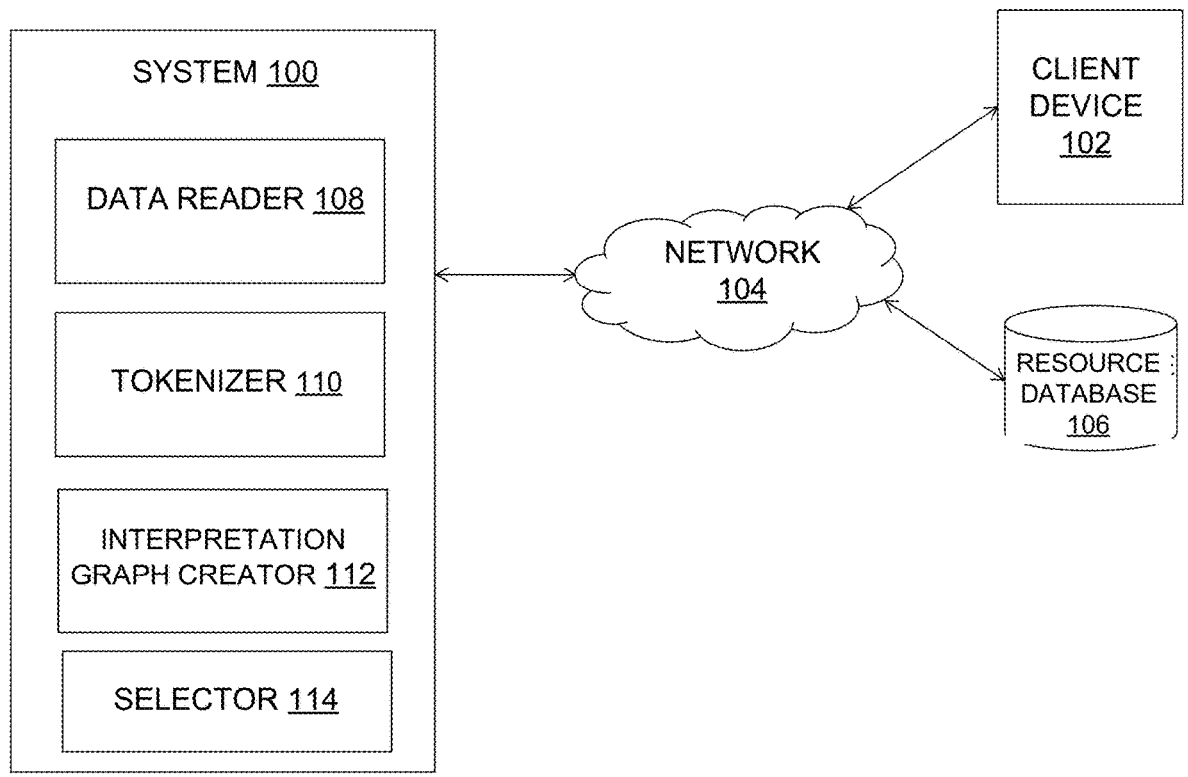
FIG. 1 illustrates a network environment implementing a system, according to an example embodiment of the present disclosure.

For simplicity and illustrative purposes, the present disclosure is described by referring mainly to examples thereof. The examples of the present disclosure described herein may be used together in different combinations. In the following description, details are set forth in order to provide an understanding of the present disclosure. It will be readily apparent however, that the present disclosure may be practiced without limitation to all these details. Also, throughout the present disclosure, the terms "a" and "an" are intended to denote at least one of a particular element. As used herein, the term "includes" means includes but not limited to, the term "including" means including but not limited to. The term "based on" means based at least in part on.

The present subject matter describes systems and methods for natural language processing. In an example, a natural language may be understood as a human language that a user uses to interact with systems. In a second example, natural language may be understood as a language, which is captured in a document or file, such as a word document or an audio file.

The disclosed embodiments illustrate methods and systems for efficiently representing, computing and deciding amongst multiple ambiguous interpretations of a natural language input. For processing an input, an interpretation graph, which represents all known ambiguous interpretations of the human natural language text may be created, processed, and manipulated. A set of operations for augmenting the interpretation graph to include alternative interpretations executed by a series of processors may be performed. Further, the present disclosure, includes a notion of confidence, which may be computed as the interpretation graph is being constructed and may be used to choose the most likely interpretation followed by any number of increasingly less likely interpretations.

In an example embodiment of the present disclosure, an input to be processed may be received. The input may be indicative of a data stream comprising raw text indicative of human generated natural language content and, therefore, may be referred to as a natural language input. The input may be received, for example, in real time, or from a from an authored document stored on a storage system, or from a voice recognition application.

Upon receiving the input, data from the data stream may be read and the data may be converted into one or more data blocks. Each data block may be considered as an example of a "lexical item". Lexical items may be connected together by vertices, the sum of which (all data blocks and vertices) is considered to be an "interpretation graph". Vertices may be understood as markers identifying the division between two or more lexical items. The vertices may also have information regarding the division, such as type of division, position, and character, which could be the division. For example a vertex could be a whitespace between two tokens, a hyphen in a composite word, or just the division without characters between two tokens extracted for a compound word like "house99", where the vertex will be the division between "house" and "99". Thus, a vertex may be indicative of a junction point, such as start point of the lexical item, such as a data block, an end point of the data bock, or a connecting point between two lexical items, in the data stream. Vertices may point to lexical items, which follow the vertex. If a vertex contains multiple pointers to lexical items that follow, these lexical items are considered to be alternative, ambiguous interpretations of the natural language content, which follows the vertex. Vertexes will often start with a single pointer to a single lexical item, which follows. Additional pointers to additional lexical items may be added as alternative interpretations of the natural language content, which follow the lexical item, are discovered as processing proceeds.

For example, the data stream may indicate, "Abe Lincoln likes the iphone-7. Abe Lincoln doesn't like the galaxy-9." The example data stream may be converted into two blocks or lexical items joined by three vertices as explained below.

The first block being, "Abe Lincoln likes the iphone-7", and the second block being "Abe Lincoln doesn't like the galaxy-9". Vertex 1 may include a pointer to the first block, "Abe Lincoln likes the iphone-7." which, in turn, contains a pointer to Vertex 2, which may include a pointer to the second block "Abe Lincoln doesn't like the galaxy-9." which, in turn, includes a pointer to a final Vertex 3. In this example, the three vertices and two lexical items described above comprise an initial creation of the interpretation graph for these sentences. It will be appreciated that in other examples, the data blocks may represent sentences, paragraphs, pages, utterances or any logical division of text appropriate to the structure of the content from the data.

In an example embodiment, once the data stream is converted into data blocks, each data block may be split into multiple tokens. For example, the data block "Abe Lincoln likes the iphone-7" may be split into five tokens, such as "Abe" as token 1, "Lincoln" as token 2, "likes" as token 3, "the" as token 4, and the "iphone-7" as token 5. Each token may also be considered as a lexical item. Thus, a lexical item may include a single token as well as a collection of one or more words as in a data block.

Upon token generation, a refining operation, interchangeably referred to as operation, may be performed on at least one lexical item, i.e., on a token(s) and/or a data block(s). In an example, the operation comprises at least one of splitting each token into one or more further tokens based on a character set, normalizing each token from an uppercase form to a lowercase form, and setting a "character" flag upon determining that the token includes a character, such as a special character, a symbol, or a number. The character set includes a list of characters that are to be considered while further splitting the tokens.

Thereafter, for each data block, the lexical items associated with the data block, such as tokens, may be tagged with semantic tags and/or syntactic tags based on at least one of an entity data and a pattern data, pattern data to include patterns derived from machine learning and/or patterns expressed in neural networks, to create an interpretation graph of each data block. In an example, an interpretation graph of a data block is indicative of alternative interpretations of each token of the data block. In an example, a data block may include an individual token or a sequence of tokens. Referring to the example above, the "Abe" token and the "Lincoln" token" may be considered as a sequence of tokens.

Examples of semantic tags include a person tag, a place tag, a food tag, a company tag, a product tag, and a person-product-preference tag. Examples of syntactic tags include noun tag, verb tag, adjective tag, active object tag and passive object tag. In the above example, based on the entity data, the "Abe Lincoln" sequence of tokens may be tagged with the semantic person tag.

Once the corresponding tags are associated with the lexical items in each data block, a confidence score for each lexical item may be determined. The confidence score may be determined based on tags associated with a lexical item or a sequence of lexical items, (using tags associated with the lexical item under consideration and tags associated with other lexical items), external data, such as popularity data, or using predetermined rules, which may include mathematical formulae. The predetermined rules may include, for example, the sum of countable metadata such as timestamps, visited count, and the number of links, where corresponding numbers may be passed through a sigmoid function. In an example, an interpretation for each data block from amongst the alternative interpretations in the interpretation graph may be selected based on the confidence score.

For example, assume the word "Paris" occurs in a data stream. In this example, two geographical "place" tags may be attached; one for Paris, Texas, and one for Paris, France. If there are no other contextual clues, such as the occurrence of the tokens "Texas" or "France" in the data stream, in an example, a rule indicating comparison of populations of the two places, which may be obtained from an external data source, may be used. Based on the comparison, corresponding confidence scores may be determined. In another example, a rule calculating the distance from the tagged places to the user's location may be used to generate the confidence scores. In a third example, a rule calculating the distance from the tagged places to other locations found in the same data block (or nearby data blocks) may be used.

In an example, a system for processing the data stream is defined. The system may include a data reader coupled to a processor to receive an input including a data stream in a natural language and convert data corresponding to the data stream into one or more data blocks joined by a vertex, the vertex being indicative of a junction point in the data stream. The system may also include a tokenizer coupled to the processor to split each of the one or more data blocks into a plurality of tokens and an interpretation graph creator coupled to the processor to create an interpretation graph for holding alternative interpretations of each data block of the input. Further, the interpretation graph may include a node and edge structure, a vertex representing a node and a lexical item representing an edge. The alternative interpretations represented as alternative paths through the interpretation graph, wherein the interpretation graph includes lexical items and vertices, a lexical item being at least one of a data block and a token. The interpretation graph creator may include a token processor to perform a refining operation on each of the plurality of tokens to further process a corresponding token to create the alternative interpretations of the one or more data blocks and a tagger. Additional processors may tag lexical items with one of a semantic tag and/or a syntactic tag, based on at least one of an entity data and a pattern data. The entity data, for instance, is indicative of an entity associated with each token, and the pattern data includes a list of patterns and the semantic tag associated with each pattern or pattern matching rules or formulae which may be computed using machine learning and may contain neural networks. Note that semantic tags and syntactic tags are also instances of lexical items in the interpretation graph. Multiple semantic tags and syntactic tags may be associated with a data block, either to tag different portions of the data block or to represent alternative interpretations of the same portion of the data block.

The system may also include a selector coupled to the processor to select an interpretation from the interpretation graph of the input. The selector may determine a confidence score for each lexical item based on at least one of a corresponding tag, the confidence score of other lexical items, and an external source, select the interpretation for each of the one or more data blocks from amongst the alternative interpretations, based on the overall confidence score, and combine the selected interpretation for each of the one or more data blocks to provide an interpretation of the input. The selector may determine the confidence score of each lexical item or for any selected interpretation from the interpretation graph, for instance, based on a machine learned based predictive technique.

In an example, the selector may search through the interpretation graph to identify a path from a first vertex to a last vertex, corresponding to a data block, with a highest overall confidence score to select the interpretation of the data block.

Additionally, in an example, the token processor may perform at least one of splitting each token into one or more further tokens based on a character set, normalizing each token from an uppercase form to a lowercase form, and setting a "character" flag upon determining that the token includes one of a special character, a symbol, and a number, to perform the refining operation. Further, in an example, the tokenizer may implement tokenization techniques on an external source to split the one or more data blocks into the plurality of tokens, the external source being a trained machine learning based source.

In an example, the interpretation graph creator may contain processes to apply at least one semantic or syntactic tag to at least one lexical item associated with a data block. Examples of semantic tags may include a person tag, a place tag, a food tag, a company tag, a product tag, and a person-product-preference tag and examples of syntactic tags include of a noun tag, a verb tag, an adjective tag, an active object tag and a passive object tag. Semantic and syntactic tags may also be representative of specific content understanding only appropriate for highly specialized domains, such as an oil and gas drilling equipment tag, a pressure test tag, a troubleshooting procedure tag, a legal contract assignment tag, or similar.

In an example, a method for processing a data stream is disclosed. The method includes receiving an input including a data stream in a natural language; converting data corresponding to the data stream into one or more data blocks joined by a vertex, the vertex being indicative of a junction point in the data stream; splitting each of the one or more data blocks into a plurality of tokens; and creating an interpretation graph for holding alternative interpretations of each data block of the input, the alternative interpretations represented as alternative paths through the interpretation graph, wherein the interpretation graph includes lexical items and vertices, a lexical item being at least one of a data block and a token, wherein creating the interpretation graph comprises, performing a refining operation on each of the plurality of tokens to further process a corresponding token to create the alternative interpretations of the one or more data blocks; and tagging processed tokens with one of a semantic tag and a syntactic tag, based on at least one of an entity data and a pattern data. The method further includes selecting an interpretation of the input from the interpretation graph, wherein selecting comprises determining a confidence score for each lexical item based on at least one of a corresponding tag, the confidence score of other lexical items, and an external source; computing an overall confidence score of a path through the interpretation graph, based on the determined confidence score for each lexical item; selecting an interpretation for each of the one or more data blocks from amongst the alternative interpretations, based on the overall confidence score; and combining the selected interpretation for each of the one or more data blocks to provide the interpretation of the input.

In another example, a non-transitory computer readable medium including machine readable instructions that are executable by a processor is disclosed. The processor is to receive an input including a data stream in a natural language; convert data corresponding to the data stream into one or more data blocks joined by a vertex, the vertex being indicative of a junction point in the data stream; split each of the one or more data blocks into a plurality of tokens; and create an interpretation graph for holding alternative interpretations of each data block of the input, the alternative interpretations represented as alternative paths through the interpretation graph, wherein the interpretation graph includes lexical items and vertices, a lexical item being at least one of a data block and a token, wherein creating the interpretation graph comprises, performing a refining operation on each of the plurality of tokens to further process a corresponding token to create the alternative interpretations of the one or more data blocks; and tagging processed tokens with one of a semantic tag and a syntactic tag, based on at least one of an entity data and a pattern data. The method further includes selecting an interpretation of the input from the interpretation graph, wherein selecting comprises determining a confidence score for each lexical item based on at least one of a corresponding tag, the confidence score of other lexical items, and an external source; computing an overall confidence score of a path through the interpretation graph, based on the determined confidence score for each lexical item; selecting an interpretation for each of the one or more data blocks from amongst the alternative interpretations, based on the overall confidence score; and combining the selected interpretation for each of the one or more data blocks to provide the interpretation of the input.

The system of the present disclosure may offer efficient, comprehensive, reliable, and accurate determination of an interpretation of the natural language input. Further, the interpretation graph efficiently represents all alternative interpretations for the natural language text. As a result, the need for early pruning of alternative interpretations is significantly reduced or eliminated. Further, natural language based inputs, which otherwise would not have been appropriately interpreted because they are more rare or unlikely, may now be processed in an accurate manner without substantially increasing computational complexity and the time required for computation. Therefore, the present subject matter may provide efficient, accurate, and reliable determination of the context of the natural language.

FIG. 1 illustrates a network environment implementing a system 100, according to an example embodiment of the present disclosure. The system 100 may also be referred to as a natural language processing system. In an example embodiment, the system 100 processes a natural language, which a user uses to interact with the system 100, in order to understand the meaning and context of the natural language. In an example, the natural language refers to a human language such as English, Chinese, Russian, German, French, Japanese, and the like as opposed to a machine language. The natural language may be a written language or a spoken language. The description hereinafter is explained with reference to English language only for the purpose of explanation and should not be construed as a limitation. One of ordinary skill in the art will appreciate that any natural language may be processed by the system 100.

In an example embodiment, the network environment may be a public network environment, including thousands of individual computers, laptops, various servers, such as blade servers, and other computing devices. In another example embodiment, the network environment may be a private network environment with a limited number of computing devices, such as individual computers, servers, and laptops. Furthermore, the system 100 may be implemented in a variety of computing systems, such as a laptop, a desktop, a tablet, and the like.

According to an example embodiment, the system 100 is communicatively coupled with a client device 102 through a network 104, such that the user of the client device 102 can interact with the system 100. Although, it is shown that the client device 102 is communicatively coupled with the system 100 through the network 104, the client device 102 may be communicatively coupled with the system 100 through one or more communication links, other than the network 104. [0039] In an example embodiment, the network 104 may be a wireless network, a wired network, a virtual network held inside of a computing device, or a combination thereof. The network 104 may also be an individual network or a collection of many such individual networks, interconnected with each other and functioning as a single large network, e.g., the Internet or an intranet. The network 104 may be implemented as one of the different types of networks, such as intranet, local area network (LAN), wide area network (WAN), the internet, and the like. Further, the network 104 may include a variety of network devices, including routers, bridges, servers, computing devices, storage devices, and the like.

Further, the system 100 is further communicatively coupled with a resource database 106 through the network 104. In an example embodiment, the resource database 106 may be an indexed database that includes resources, such as data structures. The resources are of three types, such as a blob resource, a JavaScript Object Notation (JSON) map, and a string map. The blob resource includes a simple blob of binary data. The blob resource is used to hold a JSON file, such as a pipeline configuration file. Further, the JSON Map resource includes a key/value map, where the key is a string and the value is a JSON record. Furthermore, the string map includes a key/value map, where the key is a string and the value is an array of strings.

In an example, the resource database 106 includes pipeline configurations, dictionaries, pattern data, machine learning models, and the like. In said example, the dictionaries may include an entity dictionary. The entity dictionary may be understood as a list of JavaScript Object Notation (JSON) records, indexed by entity Identities. Each JSON record represents an entity. The entity dictionary comprises entity data that is indicative of an entity associated with each token of data blocks. Further, the pattern data includes a list of patterns and a semantic tag associated to each pattern. In other words, the pattern data includes the pattern and the resulting semantic tag when the pattern is matched. An example pattern data is provided below:

| PATTERN | SEMANTIC TAG |
|---|---|
| {name} likes {product} | {person-product-preference} |
| {product} {number} | {product} |
| the {product} | {product} |
| {name} thinks {product} is wonderful | {person-product-preference} |

Further, the resource database 106 may be accessed by the system 100 for language processing. In an example, a resource manager of the system 100 may access the resource database 106. Furthermore, the resource database 106 may be periodically updated. For example, new data may be added into the resource database 106, existing data in the resource database 106 may be modified, or non-useful data may be deleted from the resource database 106. Further, although it is shown that the resource database 106 is external to the system 100, it would be appreciated by a person skilled in the art that the resource database 106 may be implemented internal to the system 100.

According to an example embodiment, the system 100 may include a data reader 108, a tokenizer 110, an interpretation graph creator 112, and a selector 114. In an example embodiment, the data reader 108, the tokenizer 110, the interpretation graph creator 112, and the selector 114 may be in communication with each other to perform the functionalities of the system 100. Further, the data reader 108, a tokenizer 110, an interpretation graph creator 112, and a selector 114 may function in a pipeline or in parallel to each other.

In an example embodiment, the data reader 108 of the system 100 may receive an input from a user of the client device 102. In an example, the input indicative of human generated natural language content may be a real-time input from a user, may be an input from voice recognition software, and/or may be a previously authored input from an author stored onto an electronic document. The input may be indicative of a data stream. In an example, the data stream comprises raw text indicative of a natural language. Upon receiving the data stream, the data reader 108 may read data from the data stream and convert the data into one or more data blocks.

For instance, the data reader 108 may identify junction points/divisions, such as a start point, an end point, and a connection point between two lexical items. The connection points may be defined by a character set such as, for example, punctuation marks, paragraph separators, or page separators. Based on the junction points, the data reader 108 may divide the data streams into one or more data blocks. In an example, for a data stream comprising two sentences, three junction points, i.e. vertices, may be determined, the three vertices being a start point, an end point, and a sentence separator indicated by a punctuation mark, such as a full stop or a comma. Based on the determined vertices, the data stream may be divided into multiple data blocks, each data block corresponding to a sentence, paragraph, page, section or other division of the content appropriate to the natural language input and external business needs of the Client Device, which uses System 100. For the initial graph created by the data reader, a single list of vertices and data blocks may be created. Each vertex points to a single data block, and each data block points to a single, further on, vertex, creating a chain of objects: vertex-→data block-→vertex-→data block-→vertex and so on, starting and ending with a vertex.

In addition, once the data is converted into one or more data blocks, the tokenizer 110 of the system 100 may split each data block into multiple tokens. In an example, a data block may be understood as a sentence and a token of the data block may be understood as a word included in the sentence. The tokenizer 110 may include a variety of sub-tokenizers (not shown in figures) for creating tokens.

Each sub-tokenizer has its own rules defined for how it splits a data block or stream into tokens. In an example, the tokenizer 100 may implement a whitespace tokenizer and may split each sentence into multiple tokens, creating a vertex per each set of continuing whitespaces between the tokens. Thus, a whitespace tokenizer of the tokenizer 100 may break text upon encountering any number of whitespace characters, such as spaces, tabs, carriage returns, and line feeds. In another example, sub-tokenizer may include a punctuation tokenizer, which may split based on punctuation characters or may split the tokens returned by the whitespace tokenizer by punctuation and so for each tokenizer in queue. Other methods are possible. For instance, in languages such as, for example, Chinese, which have no special characters to divide words, a tokenizer may use external dictionary resources and machine learning methods to split the content into tokens of one or more glyphs as appropriate to the language.

Subsequently, the interpretation graph creator 112 of the system 100 may process each token based on performing at least one operation on each token corresponding to respective data blocks. The interpretation graph creator 112 will start with the initial interpretation graph created by the data reader, and then will expand this graph to include additional vertices and lexical items.

Furthermore, the interpretation graph creator 112 may tag a sequence of tokens corresponding to a respective data block with a semantic tag or a syntactic tag based on at least one of an entity data and a pattern data to create an interpretation graph of each data block. An interpretation graph of a data block is indicative of alternative interpretations of lexical items, for instance for each token or sequence of tokens contained within the data block. Examples of semantic tags include a person tag, a place tag, a food tag, a company tag, a person-product-preference tag, and a product tag. Examples of syntactic tags include a noun tag, a verb tag, and adjective tag, an active object tag, and a passive object tag.

The interpretation graph creator 112 may process the interpretation graph by performing various operations, which may expand and manipulate the interpretation graph in multiple ways. For example, the operations may add new lexical items, such as data blocks, tokens, token sequences, syntactic or semantic tags to the interpretation graph from one existing vertex to another existing vertex; the operations may be performed to set or change confidence factors interchangeably referred to as confidence factor, confidence score, confidence score function, which can include structures such as vectors, parameters or rules; and/or the operations may be performed to add flags to lexical items or vertices.

In an example, deletions, modifications or changes to lexical item content, vertex content, or interconnections between vertices and lexical items may not be allowed. This ensures that alternative interpretations are always added and never removed; and that all alternative interpretations are preserved throughout the lifetime of processing of contents of the data block. Further, flags, which are Boolean switches that can be set on lexical items and vertices, can only ever be "set" and never "unset". This ensures that once a lexical item is flagged, it can never be un-flagged. This further allows for functions to be executed over and over on the interpretation graph, always adding new information and never removing it, until all possible interpretations and all possible understanding has been determined, given the constraints of the processing functions involved.

In an example, the interpretation graph creation is a recursive process, where an interpretation graph is created for the entire data stream, but once the first split is created and vertices and data blocks are defined, the system proceeds to create an interpretation graph for each of the data block until the end of the data stream is reached.

Thereafter, the selector 114 of the system 100 may determine, set or modify a confidence score or confidence score data including functions, parameters, vectors or other data structures associated with the lexical items. Data associated with confidence score may also include physical data such as the amount of natural language input covered by the interpretation. For instance, a confidence score may be determined for each interpretation of a lexical item based on the semantic/syntactic tag. Further, the selector 114 may select an interpretation for each data block from amongst the alternative interpretations based on the confidence score. In an example, the selected interpretation may be the interpretation, which includes tags with the highest total confidence score. The manner in which system 100 selects an interpretation for each data block is further described in detail in conjunction with FIG. 2.

Figure 2:
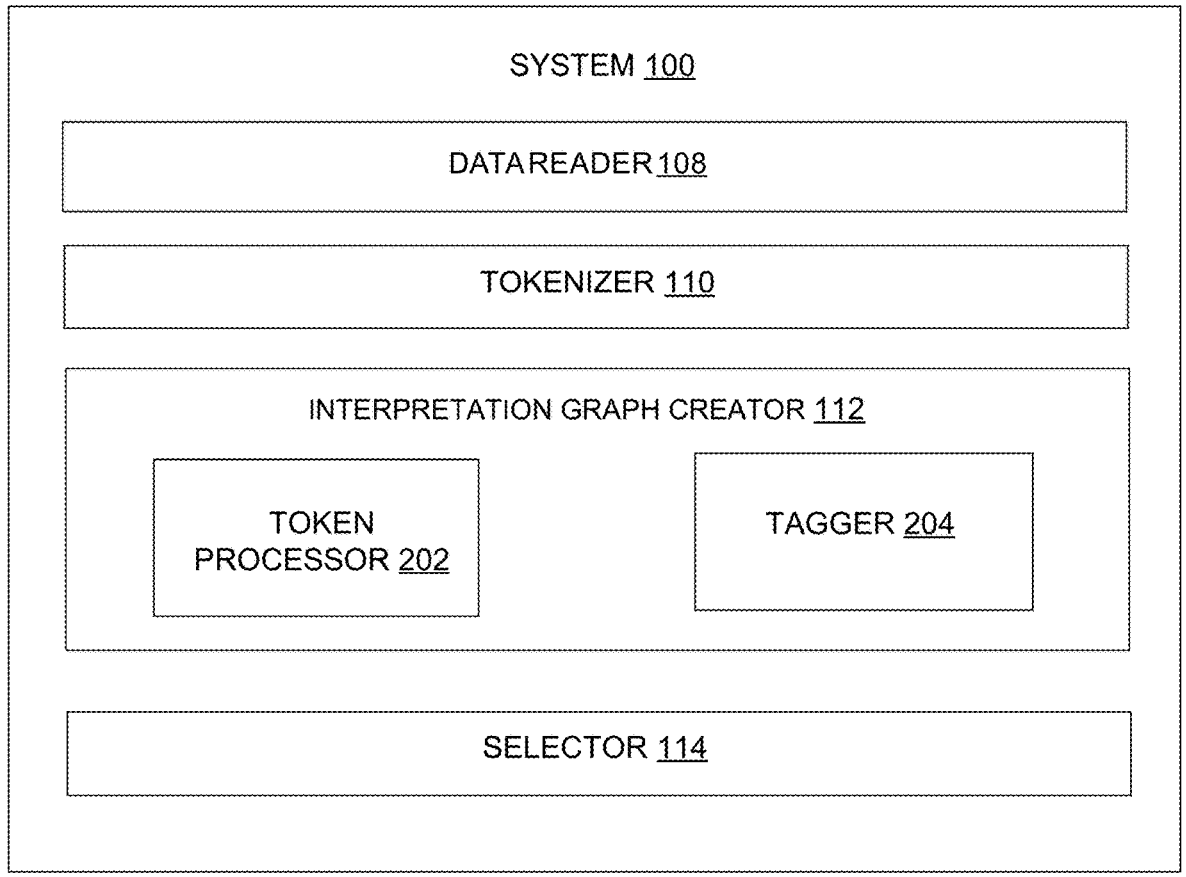
FIG. 2 illustrates a block diagram of the system, according to an example embodiment of the present disclosure.

FIG. 2 illustrates a block diagram of the system 100, according to an example embodiment of the present disclosure. As described above, the system 100 may include the data reader 108, the tokenizer 110, the interpretation graph creator 112, and the selector 114. Further, in an example embodiment, the interpretation graph creator 112 may include a token processor 202 and a tagger 204. In an example embodiment, the token processor 202 may be in communication with the data reader 108 and the tagger 204 may be in communication with the token processor 202.

In an example embodiment, the data reader 108 of the system 100 may receive an input from a user of the client device 102. The input may be an ambiguous input. In an example, the input may be indicative of a data stream. The data stream comprises raw text indicative of a natural language. For instance, the data stream may be a text from a file, a tweet, and the like. The data stream may include syntactic items, such as nouns, verbs, etc., and semantic items, such as persons, places, etc. In an example, the user may provide the input to the data reader 108 through input devices such as a keyboard, a microphone, and a pointing device, for example, a mouse or a touch pad.

Once the data reader 108 receives the data stream, the data reader 108 may read data from the data stream and convert the data into one or more data blocks. The data blocks are joined by vertices and a data block may represent a lexical item. In an example, the data reader 108 converts the data based on a Java pattern. The Java pattern identifies where a block should be split. For example, the data reader 108 may split the data on two new sentences or lines. For instance, the data may indicate, "John is my brother. John studies in fifth grade. John gave me a punch. John has a playstation-1.0." Accordingly, the data reader 108 may convert this data into four data blocks. First data block may indicate "John is my brother", second data block may indicate "John studies in fifth grade", the third data block may indicate, "John gave me a punch", and the fourth data block may indicate "John has a playstation-1.0". An example Java pattern configuration is provided below:

| JAVA PATTERN CONFIGURATION |
|---|
| {<br>  "type":"SimpleReader",<br>  "splitRegex":"\.\s+"<br>} |

Subsequently, the tokenizer 110 of the system 100 may split each data block into multiple tokens. In an example, the tokenizer 110 may split each data block into an ordered sequence of tokens. Further, the tokenizer 110 may be a whitespace tokenizer. The tokenizer 110 splits each data block into terms whenever it encounters a whitespace character. For example, the tokenizer 110 may split the data block "John gave me a punch" into five tokens, namely a token "John", a token "gave", a token "me", a token "a", and a token "punch" An example tokenization configuration is provided below:

| TOKENIZATION CONFIGURATION |
|---|
| {<br>  "type":"WhitespaceTokenizer"<br>} |

In an example embodiment, once each data block is split into multiple tokens, the interpretation graph creator 112 creates an initial interpretation graph for holding alternative interpretations of the ambiguous input represented as alternative paths through the interpretation graph. The interpretation graph includes lexical items and vertices. The lexical items are indicative of the alternative interpretations of the input, which cover a range of the input spanned by two ordered but not necessarily adjacent vertices. Further, the vertices are indicative of junction points in the input such that each junction point comprises zero or more directed arcs to zero or more lexical items, the arcs being connection between two vertices passing through lexical items.

In an example, the token processor 202 of the interpretation graph creator 112 may perform at least one refining operation on each token corresponding to respective data blocks to provide alternative interpretations of each token, and hence the data block. In an example, the at least one operation comprises at least one of splitting each token into one or more further tokens based on a character set, normalizing each token from an uppercase form to a lowercase form, and/or setting a "character" flag upon determining that the token includes a number.

In an example implementation, the token processor 202 may further split each token if a character specified in a specified character set is encountered. For example, a token may be split further when a punctuation mark is encountered. In an example, the token processor 202 may further split each token to generate alternative interpretations. For instance, the token processor 202 may further split a token "playstation-1.0" into two tokens, such as a token "playstation" and a token "1.0". Thus, it may be split in sub-tokens, which may also function as tokens. The character set includes a list of characters that are to be considered while further splitting the tokens. In an example, if the character set is not available with the token processor 202, then the token processor 202 may split the tokens based on any sequence of punctuation. As described above, the character set includes the list of characters that are to be considered while further splitting the tokens. The character set may also include a list of characters that are not to be considered while splitting the tokens. An example character set that includes the list of characters that are not to be considered while splitting the tokens is provided below:

| CHARACTER SET CONFIGURATION |
|---|
| {<br>  "type":"CharacterSplitter",<br>  "dontSplitChars":"."<br>} |

Based on the above example character set, the token processor 202 may split the tokens based on all punctuations, except periods ".". For example, the token processor 202 may split the token "Playstation-1.0" into a token "Playstation" and a token "1.0".

Further, in an example implementation, the token processor 202 may normalize each token from an uppercase form to a lowercase form. For each token, the token processor 202 may determine if the token is in the uppercase form or not. On determining the token to be in an uppercase form, the token processor 202 normalizes the token into the lowercase form. Note that both forms of the token (the original-case version and the lowercase version) are maintained as alternative interpretations in the interpretation graph. For example, the token processor 202 may normalize a token "John" to a token "john". As would be understood, based on the above example, two alternative interpretations of the token "John" are produced as an output. The first being the token "John" and the second being the token "john". Likewise, various alternative interpretations of each token are produced. In an example implementation, the token processor 202 stores all the alternative representations in its internal storage (not shown in FIG. 2) as extensions to the interpretation graph.

Furthermore, in an example implementation, the token processor 202 may set a "number" flag upon determining that the token represents or includes a number. The number may be an integer, such as 0, 1, and 100, a floating number, such as 0.5, 12.2, and 3.14159, and a negative number, such as −1003 and −12.2, or various other representations of numbers, including Roman numerals and scientific notation.

In an example implementation, the tagger 204 of the interpretation graph creator 110 may tag a sequence of tokens corresponding to a respective data block with a semantic tag based on at least one of an entity data and a pattern data to create a new lexical item or a new alternative interpretation and add it to the interpretation graph of each data block from one existing vertex to another. As described earlier, the entity data is indicative of an entity of interest such as a place, person, product, company, concept, action, syntactic element, etc. Further, the pattern data may include a list of patterns and a semantic tag and possibly entity associated to each pattern. The sequence may include one or more tokens or sequences, which contain tokens and other tags. In an example, the semantic tag comprises at least one of a person tag, a place tag, a product tag, an active object tag, a passive object tag, and a person-product-preference tag.

The token processor 202 or the tagger 204 may also create a sequence of new lexical items, such that each lexical item is joined by a vertex. The entire sequence of new lexical items is added to the interpretation graph from one existing vertex to another.

Further, the tagger 204 may modify confidence score of the lexical items, such as tokens. In an example, a confidence score can be any floating-point number, a multi-dimensional vector, or any complex data structure.

Referring to the example discussed above regarding the occurrence of "Paris" in data stream, a confidence vector might include values for the population of the tagged location and for the distance to the user's known location (a two-value vector), and the confidence score may be calculated using a formula, which combines the two numbers, such as (log(population)−log(distance)). As a second example, the distance used in the above formula could be the average distance between "Paris" and other locations tagged in the data stream (in the same data block or near-by data blocks).

The complex data structure represents rules for computing the confidence score based on the confidence score of other lexical items. In an example, the confidence of a semantic tag may be a rule based on the lexical items, which were combined together to make up the tag (e.g. the scope of the input content which the tag covers and all of the lexical items within that scope). The rules may also include external factors, such as the popularity of a lexical item from an external database. For example, in the absence of other information, 'trump' likely refers to "Donald Trump, 45th President of the United States" over "Donald Trump, oncologist from Falls Church, Virginia".

Furthermore, the external database may include semantic information about the lexical item and the confidence factor is determined based on how well the external semantic information matches internal contextual information of the interpretation and other alternative interpretations. For instance, 'Michael Phelps, basketball player' is more likely to refer to "Mike Phelps", the LA Clippers player than "Michael Phelps" the Olympic swimmer or "Michael E. Phelps" the positron emission tomography (PET) inventor. Further, the computation of confidence for any lexical item or collective interpretation may be expressed as an optimization formula, which may be computed using a quantum computer. The computation of confidence score for any lexical item may be based on an output of predictive technique trained from prior examples using machine learning including but not limited to neural networks. The tagger 204 augments and refines the interpretation graph by adding the tags. Functions that augment the interpretation graph may be executed as a simple pipeline or sequence of processing functions which are executed in sequential order. The functions may also be executed using parallel processing with many threads or machines operating on the same interpretation graph at the same time.

In an example, the lexical items may include tokens derived from data blocks using tokenization techniques, for example, splitting arrays of characters into words or tokens. Further, the lexical items may include tokens derived from one or more other tokens. Further, the lexical items may represent syntactic elements derived from other lexical items including, but not limited to tokens and other previously identified syntactic elements. The syntactic elements may be parts of speech such as noun, verb, adjective, etc. Further, the syntactic elements may be sentence structure including but not limited to phrases, subordinate clauses, subject, object, and modifier phrases. According to an example, the tokens and the syntactic elements may be derived from external resources such as but not limited to dictionaries or lists. The external resources may be trained machine learning models, such as neural network.

As described earlier, the entity data is indicative of an entity associated with a token or sequence of tokens. Further, the pattern data includes a list of patterns and a semantic tag or syntactic tag associated to each pattern. The sequence of tokens may include one or more tokens. In an example, the semantic tag comprises at least one of a person tag, a place tag, a food tag, a company tag, a product tag and a person-product-preference tag, and the syntactic tag includes a noun tag, a verb tag, an active object tag, and a passive object tag.

In an example, an interpretation graph of a data block is indicative of a large number of alternative interpretations of the natural language contained within the data block. Every token or sequence of tokens in a piece of text could have multiple interpretations. The interpretation graph depicts all possible known interpretations and possible known combinations of interpretations of a piece of natural language text efficiently. Further, interpretation graph is made from vertices and lexical Items. In an example, the lexical items may be data blocks, tokens, or semantic or syntactic tags. Lexical items are basically carriers of syntactic or semantic information. Further, vertices are junction points between interpretations. In an example, the interpretation graph represents a "node and edge" structure, a vertex representing a node and a lexical item representing an edge. Further, the lexical items and vertices may be associated with flags. The flags are bits, which can be turned on or set for lexical items and vertices. The flags are typically used for unambiguous, processing-related functions. The function of flags is to control down-stream processing. Examples of flags for lexical items and vertices include "TEXT BLOCK" flag, "TOKEN" flag, "SEMANTIC_TAG" flag, "ALL_UPPER_CASE" flag, "TITLE_CASE" flag, "MIXED_CASE" flag, "WHITESPACE" flag, and "PUNCTUATION" flag.

As described earlier, entity data included in the entity dictionary is stored in the resource database 106. Further, the entity dictionary is a list of JSON records. An example entity dictionary format is provided below:

ENTITY JSON FORMAT

```
{
   "id":"Q28260",
   "tags":["{city}", "{administrative-area}", "{geography}"],
   "patterns":[
      "Lincoln", "Lincoln, Nebraska", "Lincoln, NE"
   ],
   "confidence":0.95,
      ...additional fields as needed go here...
}
```

As shown in the above example, "id" is an identifier that identifies the entity by a unique identity, in the example above identifier of the city "Lincoln, Nebr.". The identifier is unique across all entities in all dictionaries regardless of its type. Further, "tags" refers to a list of semantic tags which will be added to the interpretation graph whenever any of the patterns are matched. In the example above, "Lincoln, Nebr." is all three of a "city", an "administrative-area", and a "geography".

The tagger 204 tags a sequence of tokens with a semantic tag. In an example, the tagger 204 may tag semantic tags for entities. In an example, the tagger 204 may look up for sequences of tokens in the entity dictionary and then tags the sequence of tokens with one or more semantic tags as alternative representations. Typically, these semantic tags represent entities such as person, place, company, etc.

In an example implementation, the tagger 204 tags all the possibilities, including overlaps and sub-patterns, with the probability that the selector 114 may select semantic tags that are the best interpretation. In an example, for the data block "abraham lincoln likes macaroni and cheese", the tagger 204 may look up in the entity dictionary to determine the interpretations of the data block "abraham lincoln likes macaroni and cheese". In said example, "abraham lincoln" may be person's name in the entity dictionary, "lincoln" may be as a place, and "macaroni", "cheese" and "macaroni and cheese" may be specified as foods. Accordingly, the tagger 204 may tag "abraham lincoln" with a person tag, "lincoln" with a place tag, "macaroni" with a food tag, "cheese" with a food tag, and "macaroni and cheese" also with a food tag. In an example, the semantic tags may identify semantic interpretations of the tokens. The semantic interpretations may include entities like person, place, food, etc. to full sentence interpretation like person-fact-request, restrictive-covenant-term, language-fluency-statement, and the like. Similarly, the tagger 204 looks up the pattern data and if a pattern is matched, then data block will be tagged with the corresponding semantic tag.

In another example, tagging may be performed using a machine learning algorithm or neural network algorithm, to identify sequences of tokens which are tagged as entities or classified as actions or intents. In yet another example, both pattern-based approaches and machine-learning based approaches, all of which can create ambiguous, conflicting, overlapping semantic tags may be used. As a result, the system 100 may efficiently handle multiple, ambiguous possibly overlapping and possibly conflicting alternative interpretations for semantic tags (as well as other constructions or lexical item interpretations).

Further, the selector 114 selects alternative interpretations from the interpretation graph. In an example, the selector 114 may determine a confidence score for each interpretation based on the semantic tag. A confidence score of an interpretation is a probability of correctness of the interpretation. In an example, selector 114 may determine the confidence scores based on the resource database 106 and various other external sources. In an example, the confidence score of each entity builds up based on context and how the entity participates in larger patterns. The selector 114 determines the confidence score for each interpretation such that overall confidence score of a path through the interpretation graph from one vertex to another vertex is determined.

In an example, confidence scores associated with lexical items may be specified as floating point numbers from 0.0 to 1.0. These confidence scores may be set by the tagger 204 to an initial value, which may be adjusted later during further processing. In an example, the selector 114 may set the confidence scores of one or more lexical items, for instance, using information inside the interpretation graph. In an example, the selector 114 may determine the confidence scores based on the resource database 106 and various other external sources. For example, the confidence score of each entity builds up based on context and how the entity participates in larger patterns. In an example implementation, semantic tags, which cover more tokens, may be given higher confidence scores than tags that cover fewer tokens. In a second example implementation, semantic tags which are built up from tokens and other, nested semantic tags may be given a confidence based on the confidences of the lexical items from which it is built. If the nested items have, together, a higher confidence, then the semantic tag from which they are built will also have a higher confidence.

In other examples, the selector 114 may also refer to external information. For instance, an interpretation of "Trump" (entity Q22686—the 45th president of the United States) may be given a higher confidence score over the interpretation "Trump" (Q27947481—American Oncologist) based on download frequencies of their respective articles from a source such as, for example, Wikipedia.

The selector 114 may also use a mixture of internal and external information. For example, "Michael Phelps, basketball player" is more likely to be "Michael Phelps" (Q1636850—American Basketball player for the LA Clippers) than "Michael Phelps" (Q39562—Olympic Swimmer) because other tokens in the interpretation graph (e.g. "basketball" and "player") are more frequently found in one person's Wikipedia article over the others. Likewise, many other confidence setting formulae and rules may be possible.

Once the confidence scores may be set for the lexical items, the selector 114 may determine a confidence score for an "end to end" sentence (or data block) interpretation based on the lexical items involved. Thereafter, the selector 114 may select an interpretation for each data block from amongst the alternative interpretations based on the confidence score. The selected interpretation may be an interpretation with a highest confidence score. In an example, the confidence scores for the entities increases as the entities participate in larger and larger constructions, leading towards the example "person-product-preference" interpretation or other full-sentence interpretation which ends up dominating other interpretations which do not cover as much of the natural language input.

The selected interpretation may also be the interpretation with the highest average confidence, or it may be selected from specified tags with the highest confidence scores, or it may include additional predefined logic, such as a business related rules. For instance, instead of highest/maximum confidence score, a predefined rule may be used, which may state "if the current text is from a real estate appraisal, then use maximum confidence to choose; otherwise, use average confidence to choose". As a second example, the business rule may specify certain interpretations to exclude. For instance, for a real estate appraisal, exclude all interpretations which use tagged entities from the automotive database.

In an example, the selector 114 searches through the interpretation graph to identify the path from a first vertex to a last vertex with a highest confidence score. The selector 114 can then find increasingly less like interpretations, above a specified threshold, which may be zero. The determination of the best interpretation from the interpretation graph may be expressed as an optimization formula which may be computed using a quantum computer.

In an example, the system 100 may process each data block through a pipeline of text processing stages. The pipeline may be specified in a JSON format as provided below:

```
SAMPLE JSON PIPELINE CONFIGURATION

{
  "reader": {
    "type": "SimpleReader",
    "splitRegex": "\r\n\r\n"
  },
  "stages": [
    { "type": "WhitespaceTokenizer" },
    { "type": "CharacterSplitter" },
    { "type":
"com.searchtechnologies.lpt.engine.stages.CaseAnalysisStage"
    },
    {
      "type": "DictionaryTagger",
      "dictionary":"resources-provider:dictionary",
      "required":["TOKEN", "ALL_LOWER_CASE"] '
    }
  ]
}
```

In the example above, there are two sections to the pipeline configuration. The "reader" section includes configuration for the data reader 108. Further, the "stages" section includes a list of pipeline stages. The "type" field specifies the class, such as Java class, which is the pipeline stage which could be a fully qualified java package and class name, for example "com.searchtechnologies.lpt.engine.stages.CaseAnalysisStage", a simple stage name without "Stage" at the end or any other class name.

Although it is described that the interpretation graph is created as an output of the tagger 204, it would be appreciated by a person skilled in the art, that the interpretation graph may be created as an output of the data reader 108 and thereafter the interpretation graph is worked upon by each of the tokenizer 110, the token processor 202, the tagger 204, and the selector 114 to get a final interpretation graph. In an example, each of the data reader 108, the tokenizer 110, the token processor 202, the tagger 204, and the selector 114 may build up the interpretation graph using transformations to add alternative interpretations to existing interpretations, possibly leveraging the resource database 106.

Further, new interpretations may refine, overlap, or provide alternatives to existing interpretations in the interpretation graph. Having all possible computed interpretations preserved in the interpretation graph (rather than being pruned out or discarded at an earlier stage of processing) allows for choosing which interpretation is most likely to be correct from amongst all possible interpretations, both likely and unlikely.

In the present disclosure, the system 100 attempts to combine both statistical analysis, machine learning methods and knowledge-based methods into a single, holistic method to achieve both high precision and broad coverage. Further, the interpretation graph integrates syntax and semantics into a single, holistic interpretation. This interpretation allows for any combination of syntax and semantics to be used to determine confidence scores for the alternative interpretations. Further, the interpretation graph provides a transparent natural language representation, which can be easily understood, manipulated, and debugged. Thus, the process of determination of an appropriate interpretation of the natural language may be performed by the system 100 in an efficient, reliable, and accurate manner.

FIGS. 3A-3L illustrate various stages of processing of a data block by the system, according to an example embodiment of the present disclosure. Each figure illustrates an interpretation graph.

Figure 3A:
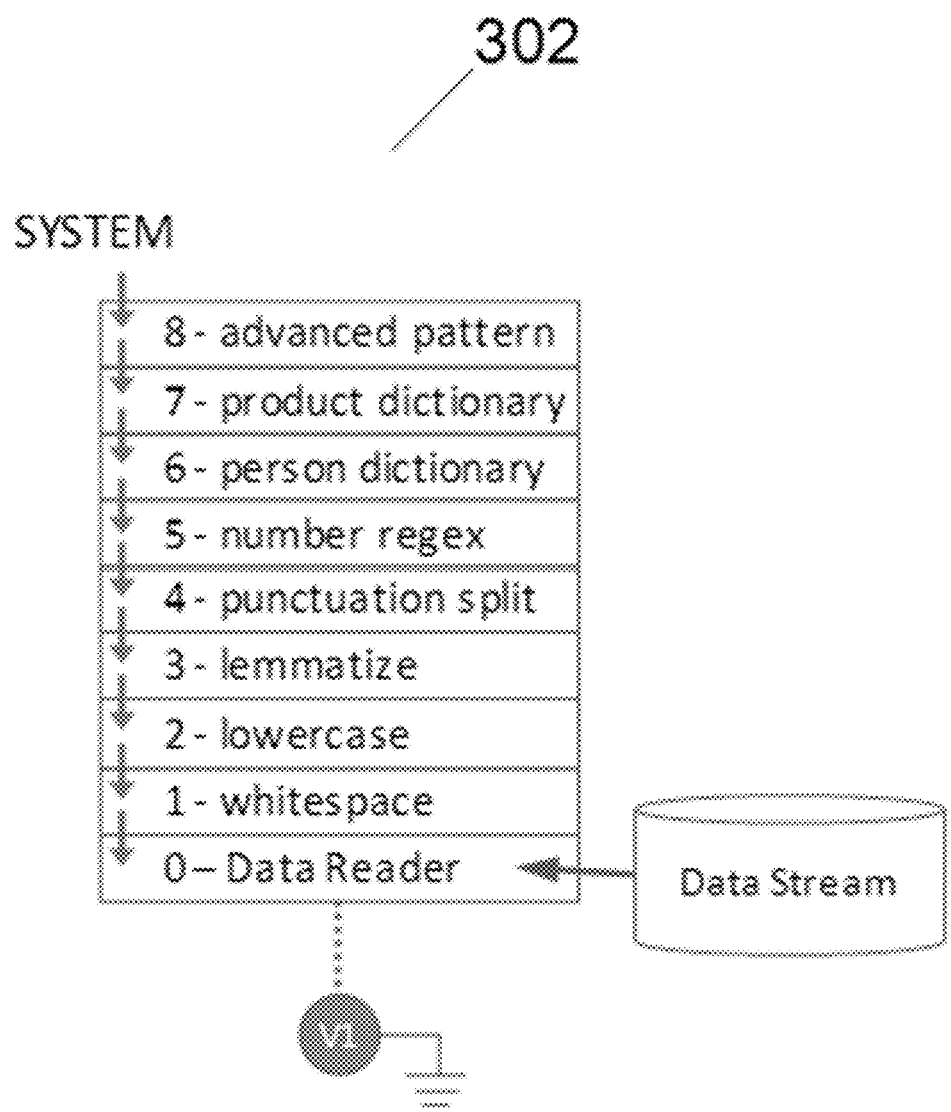

FIG. 3A illustrates a graphical representation 302. As can be seen in FIG. 3A, the system includes various components, such as a data reader, tokenizers such as a whitespace component, a lowercase component, lemmatize component, and punctuation split, and interpretation graph creator, which may include number regex, and taggers, such as person dictionary, product dictionary, and advanced pattern. Further, FIG. 3A depicts that the data reader reads a data stream.

Figure 3B:
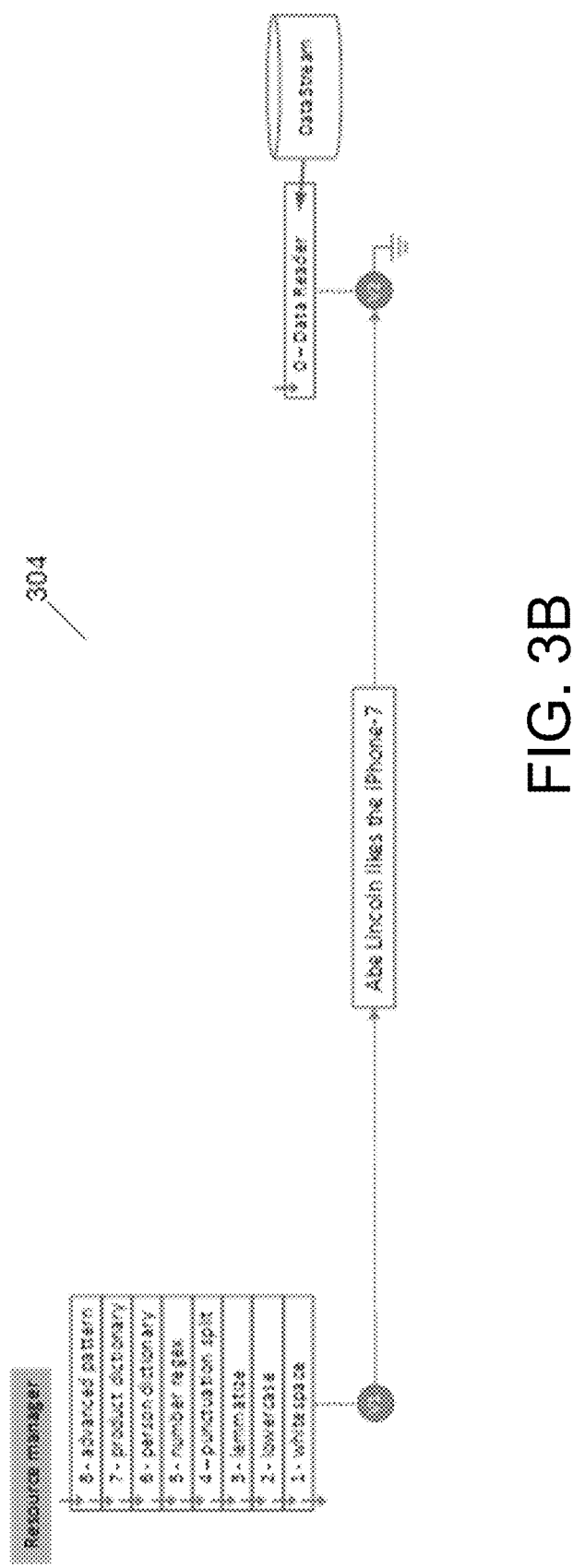

FIG. 3B illustrates a graphical representation 304. As can be seen in FIG. 3B, the data reader converts the data stream into the data block "Abe Lincoln likes the iPhone-7".

Figure 3C:
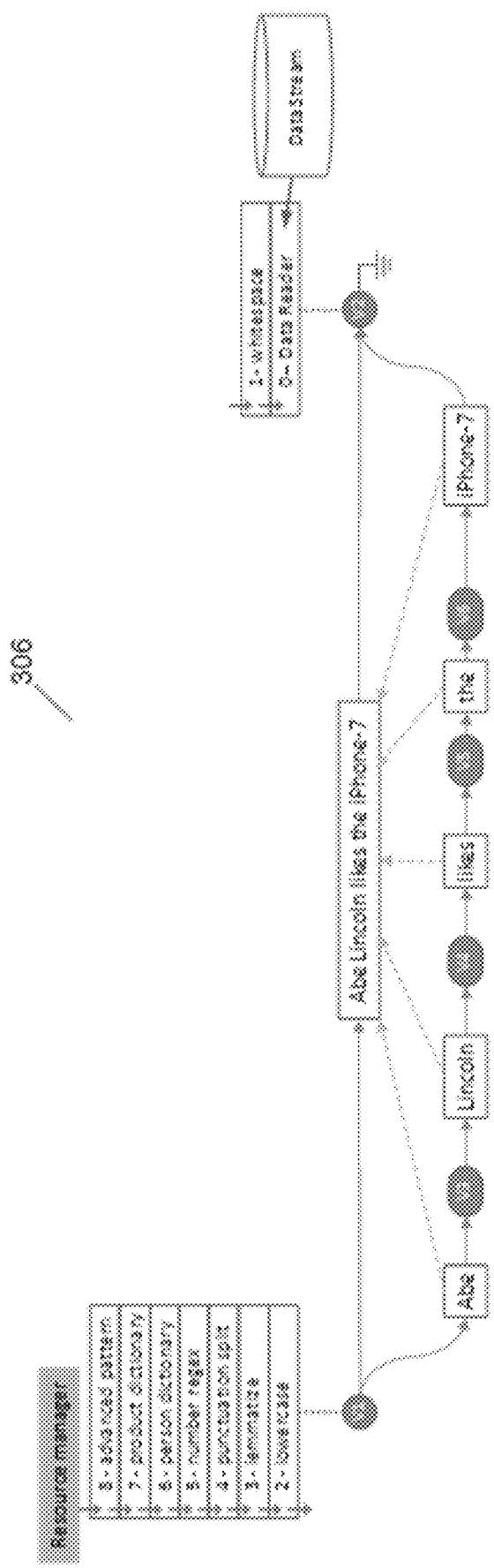

FIG. 3C illustrates a graphical representation 306. As can be seen in FIG. 3C, the whitespace component of the system splits the data block into tokens. For example, the whitespace component splits the data block "Abe Lincoln likes the iPhone-7" into five tokens, such as the Abe" token, "Lincoln" token, "likes" token, "the" token, and the "iPhone-7" token. FIG. 3C illustrates the interpretation graph for the data block. The interpretation graph is made from vertices and lexical Items. A vertex may be denoted by "V". In an example, the lexical Items may be a data block and tokens. The junction points between lexical items are referred to as vertices. For example, vertex V3 is a junction point between the token "Abe" and the token "Lincoln". The vertices save all presentational clues used for further processing downstream as appropriate. For the white-space tokenizer, this means that the string of white-space characters which denote a separation between two tokens is saved with the vertex that they represent.

Figure 3D:
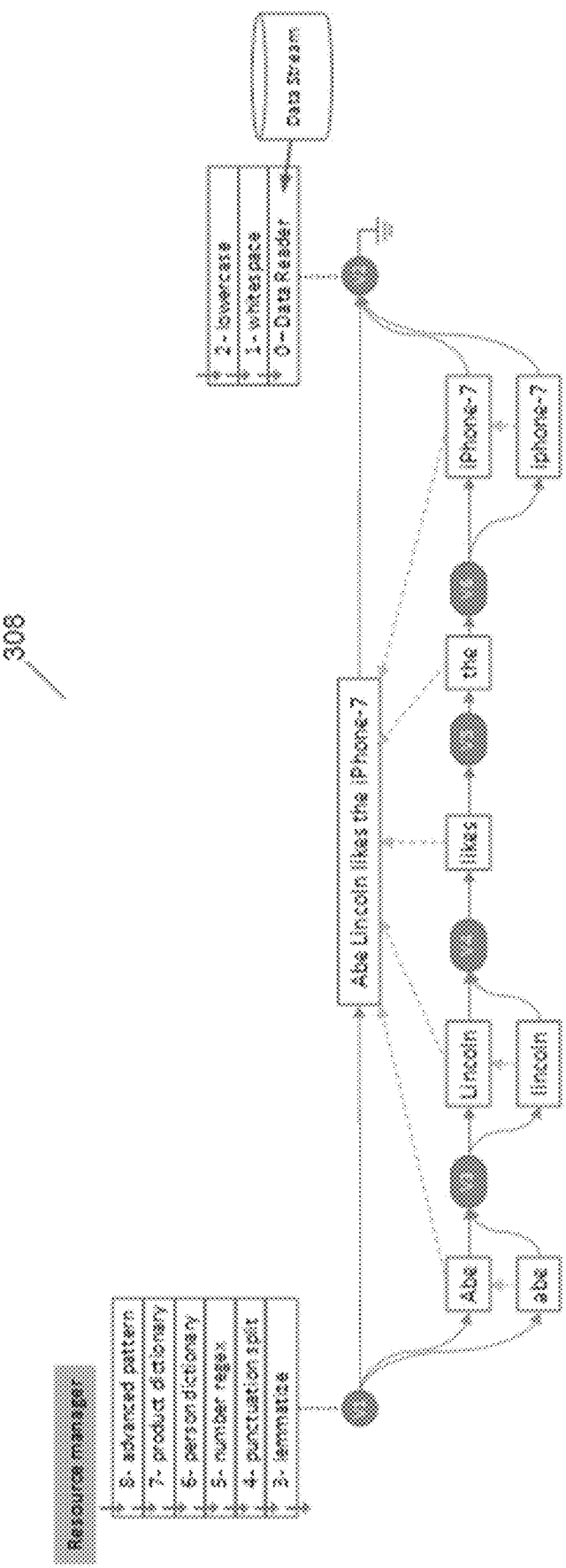

FIG. 3D illustrates a graphical representation 308. As can be seen in FIG. 3D, the lowercase component of the system converts each token into a lowercase form as an alternative interpretation if the token contains uppercase characters. For example, the lowercase component converts the token "Abe" into the token "abe". Further, the lowercase component converts the token "Lincoln" into the token "lincoln". Accordingly, there are four different interpretations of Abe Lincoln, i.e., "Abe Lincoln", "Abe lincoln", "abe Lincoln", and "abe lincoln". The interpretation graph efficiently saves all known alternative interpretations for later processing.

Figure 3E:
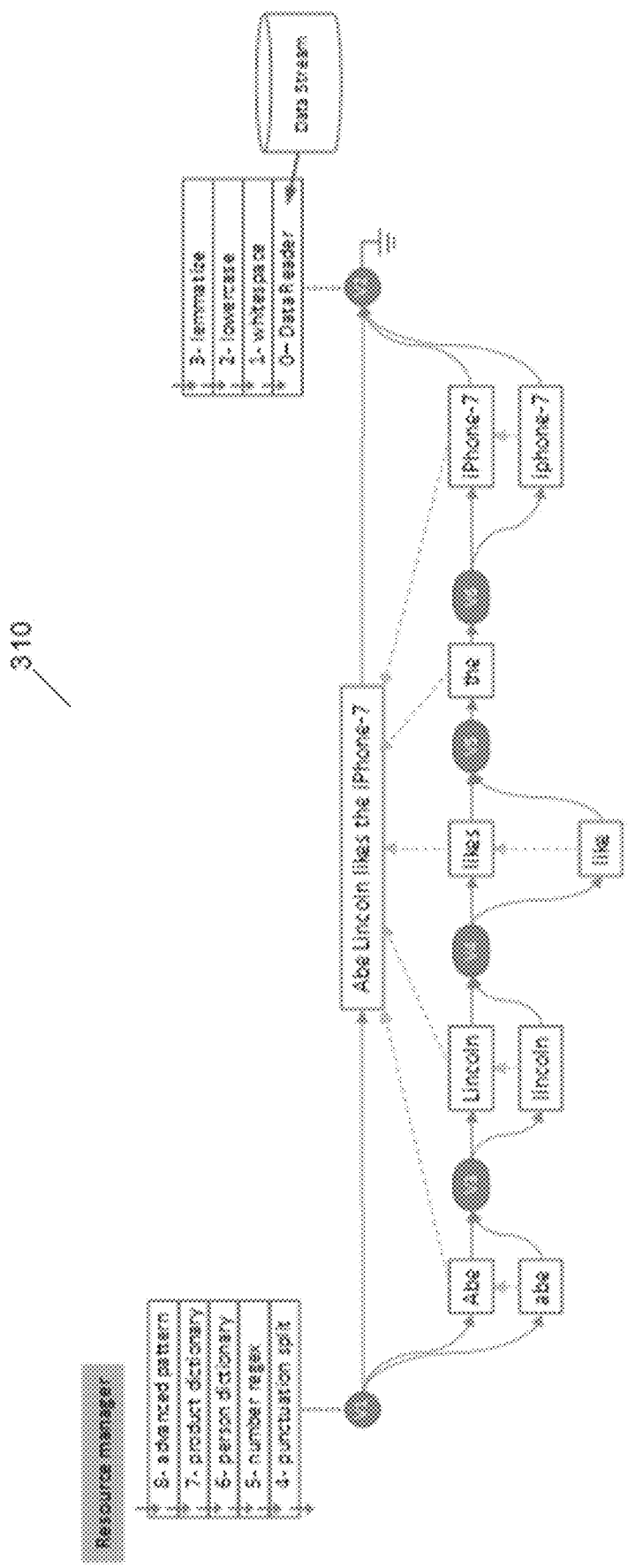

FIG. 3E illustrates a graphical representation 310. As can be seen in FIG. 3E, a lemmatize component of the system lemmatizes the tokens. For example, the lemmatize component lemmatizes the token "likes" and reduces it to the root form (the infinitive form of the verb, or the singular form of the noun) "like". Accordingly, two alternative interpretations are produced for the token "likes", one being token "likes" and other being token "like". This now represents 17 different interpretations of the original content (all of the different possible paths through the interpretation graph from Vertex V1 through to Vertex V2).

Figure 3F:
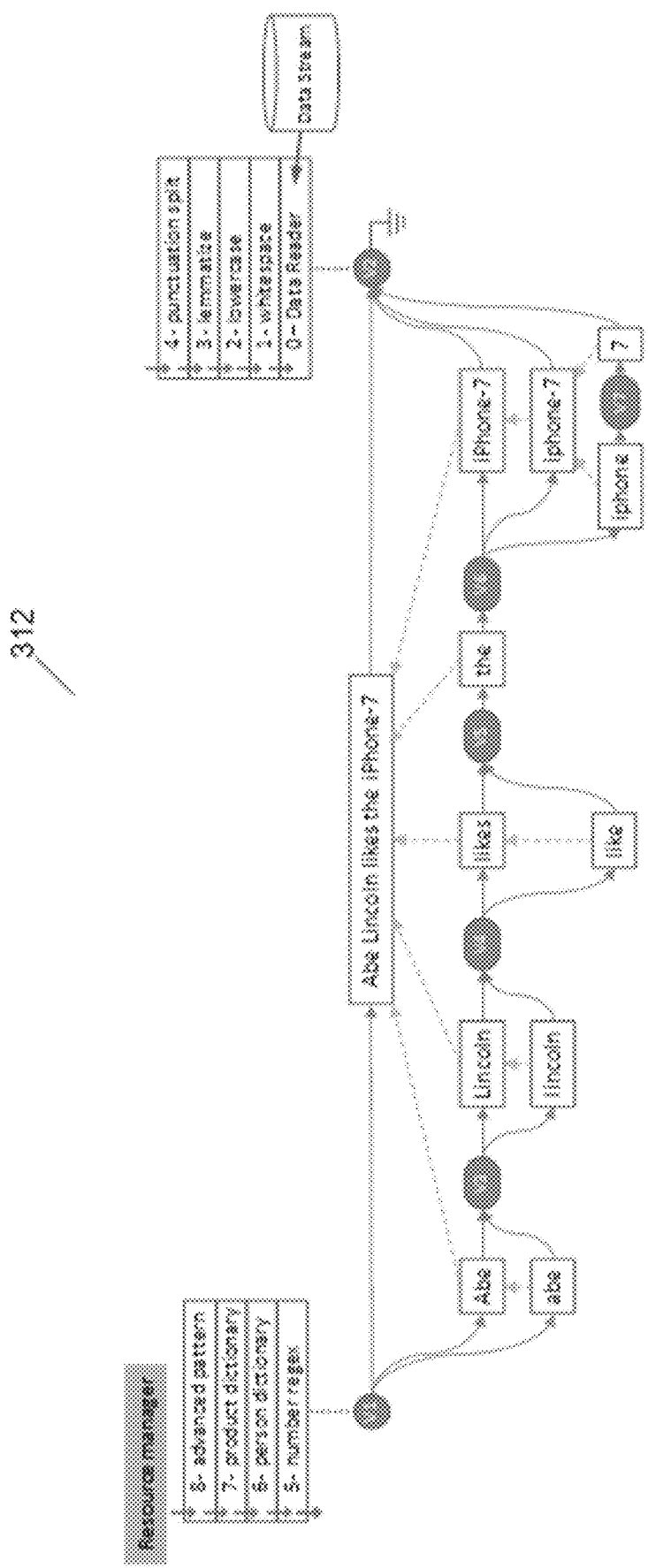

FIG. 3F illustrates a graphical representation 312. As can be seen in FIG. 3F, a punctuation split component of the system further splits the tokens based on punctuation. For example, the punctuation split component splits the token "iphone-7" into two tokens, namely token "iphone" and token "7". The dash character is not lost in this split but stored in the intervening vertex. Although not shown in FIG. 3F, the punctuation split component also splits the token "iPhone-7" into two tokens, namely token "iPhone" and token "7". The interpretation graph as shown in FIG. 3F now represents 25 different interpretations of the content (i.e. 25 different paths from V1 through to V2).

Figure 3G:
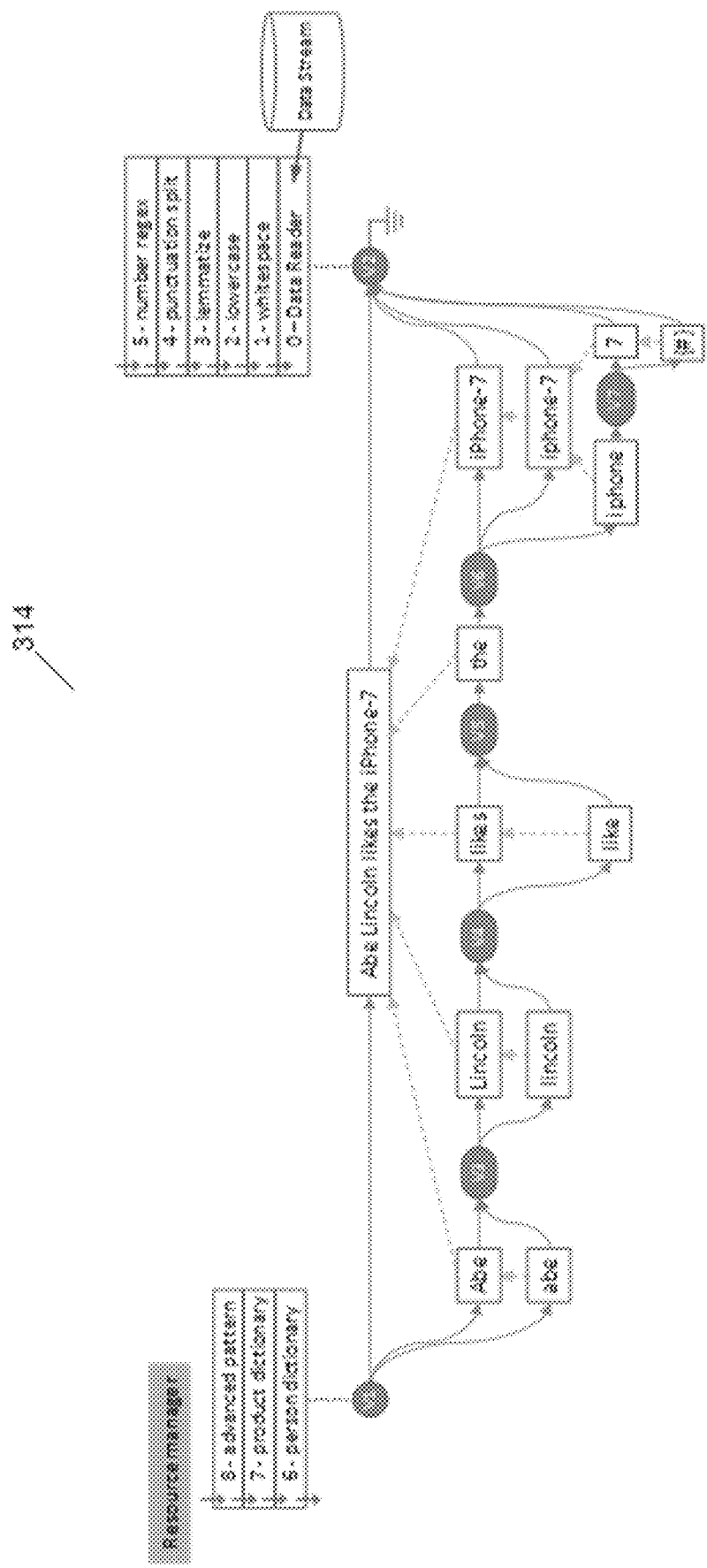
Figure 3H:
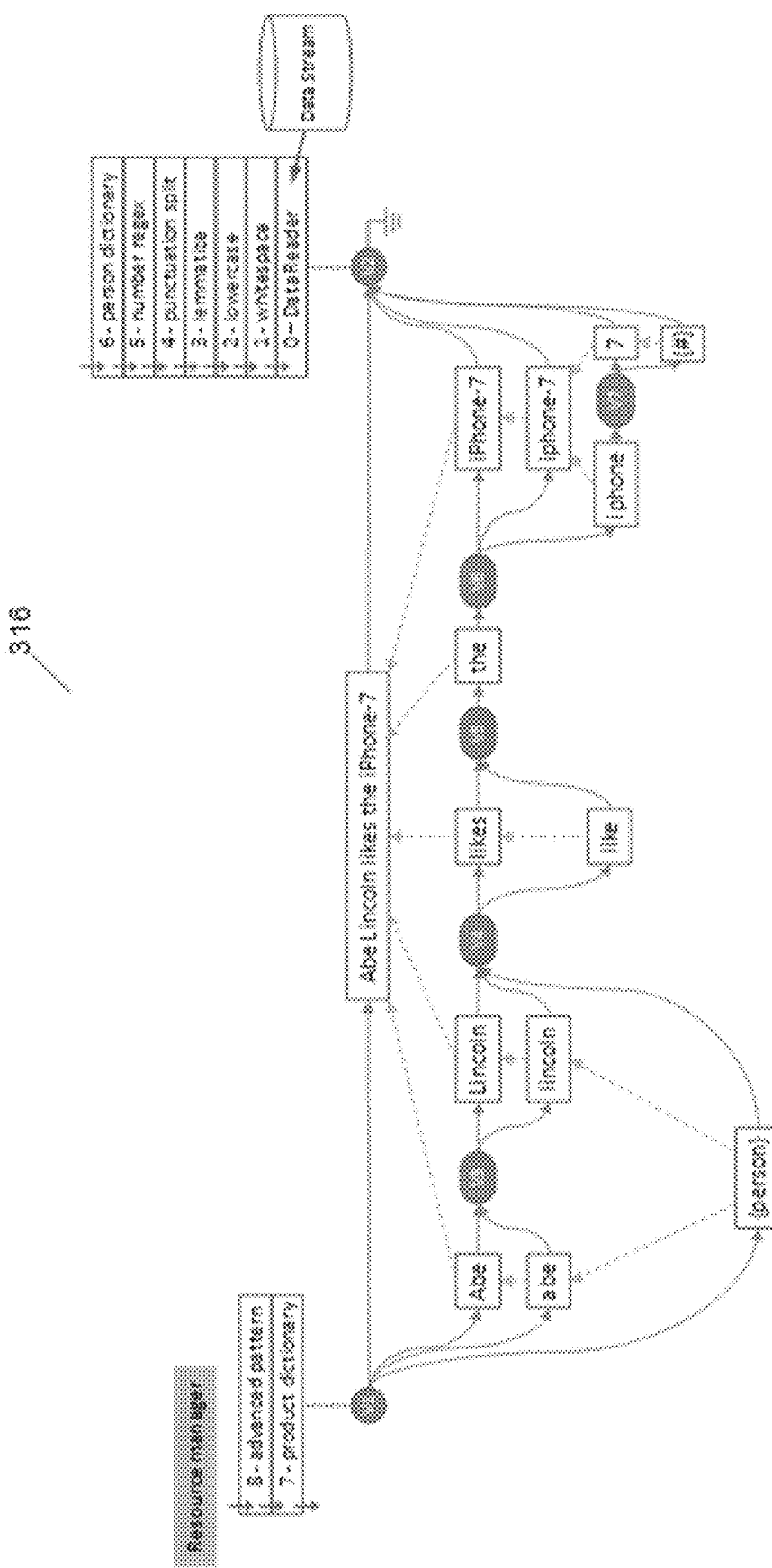
Figure 31:
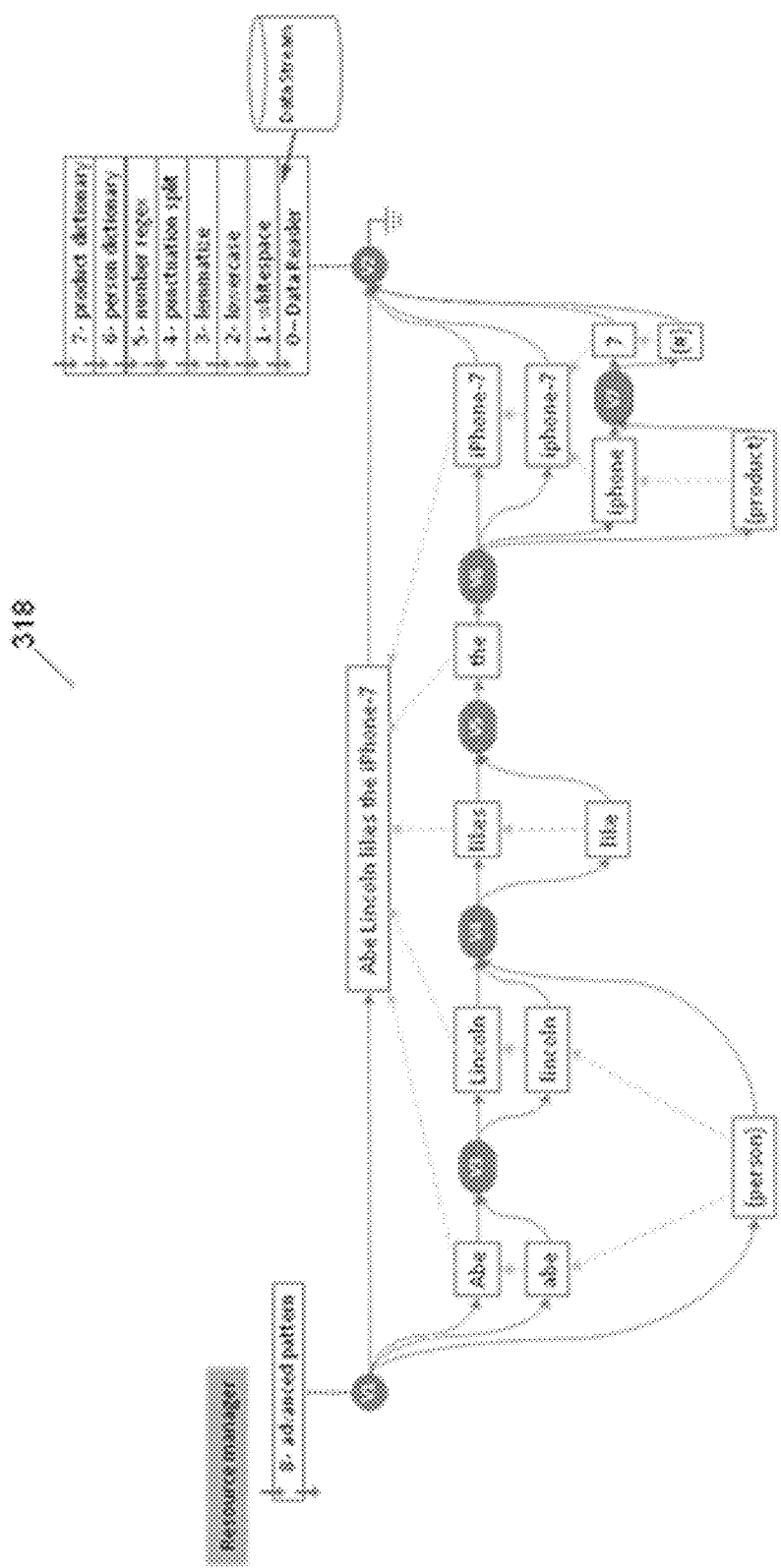

FIG. 3G illustrates a graphical representation 314. As can be seen in FIG. 3G, a number regex component of the system sets a "number" flag upon determining that the token includes a number. For brevity of the presentation, a "number" tag is represented as "{#}". There are now 37 different interpretations through the interpretation graph FIG. 3H illustrates a graphical representation 316. As can be seen in FIG. 3H, a person dictionary component of the system tags a sequence of tokens with a semantic tag, such as a person tag. As can be seen in FIG. 3H, the person dictionary component tags a token sequence "Abe Lincoln" with the person tag. Further, the person dictionary component tags a token sequence "abe lincoln" with the person tag. As can be seen in FIG. 3H, the person dictionary component tags a token sequence from Vertex V1 through to Vertex V4 with the person tag. The precise tokens, which were combined to create the "{person}" tag, are preserved, as shown with the grey dotted lines in the figure. Multiple instances of the same tag covering the same span of text (e.g. from the same starting vertex to the same ending vertex) with the same content may be de-duplicated. In the example, two person tags which span from Vertex V1 to Vertex V4 which represent the same person (e.g. the same person ID) would be redundant. In the example implementation, the process which adds new semantic tags to the interpretation graph first checks to see if there is already a tag, which covers the same starting and ending vertex for the same entity. If this is the case, the new tag would be redundant (it adds no new information) and it is not added to the interpretation graph.

FIG. 3I illustrates a graphical representation 318. As can be seen in FIG. 3I, a product dictionary component of the system tags a sequence of tokens with a semantic tag, such as a product tag based on an entity data. As can be seen in FIG. 3I, the product dictionary component tags the token "iphone" with the product tag.

Figure 3J:
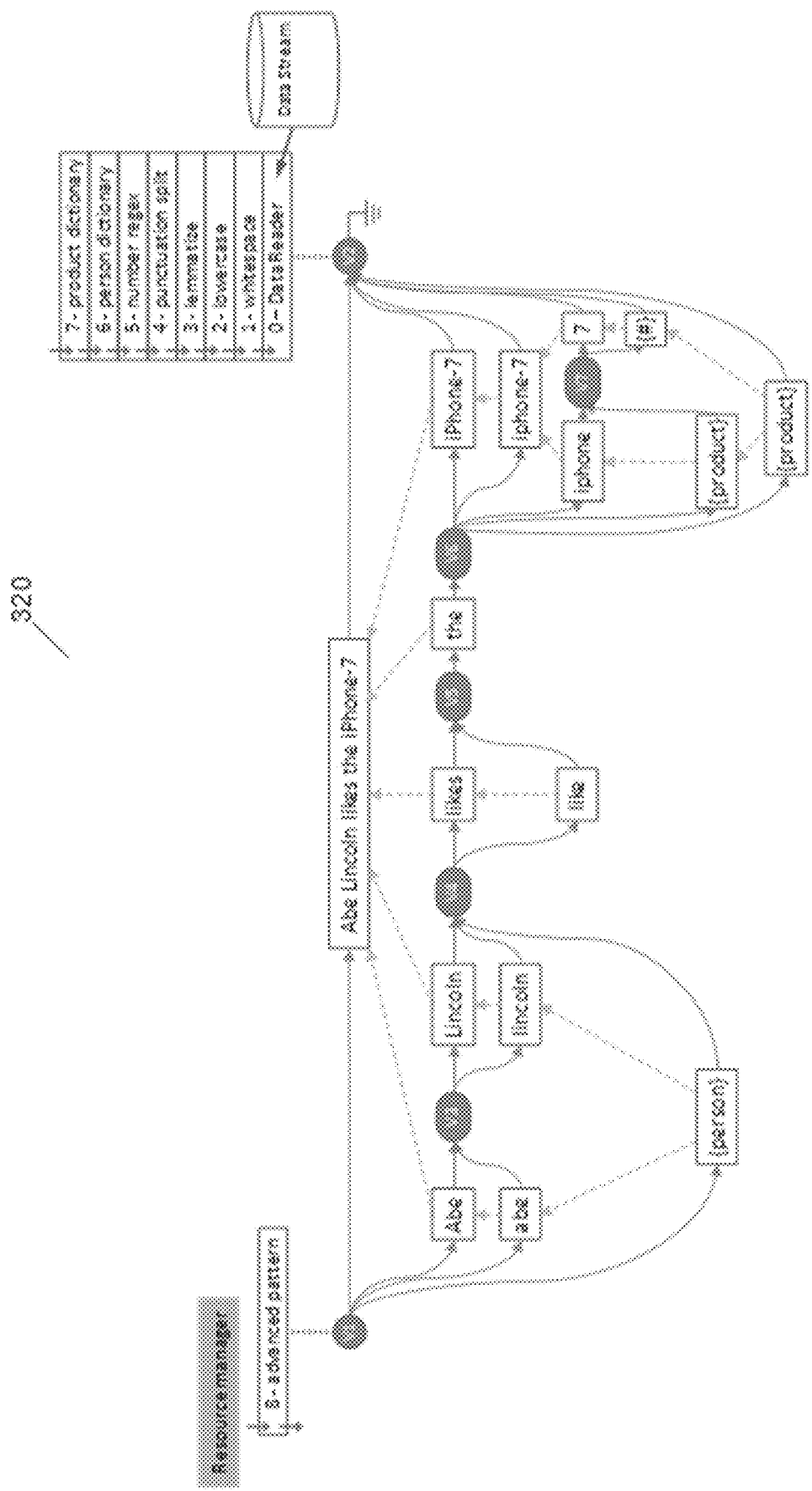

FIG. 3J illustrates a graphical representation 320. As can be seen in FIG. 3J, the advanced pattern component of the system tags a sequence of tokens and semantic tags with a semantic tag, such as the product tag followed by a number based on a pattern data. As can be seen in FIG. 3J, the advanced pattern component tags the token sequence "{product}, {#}" with the product tag.

Figure 3K:
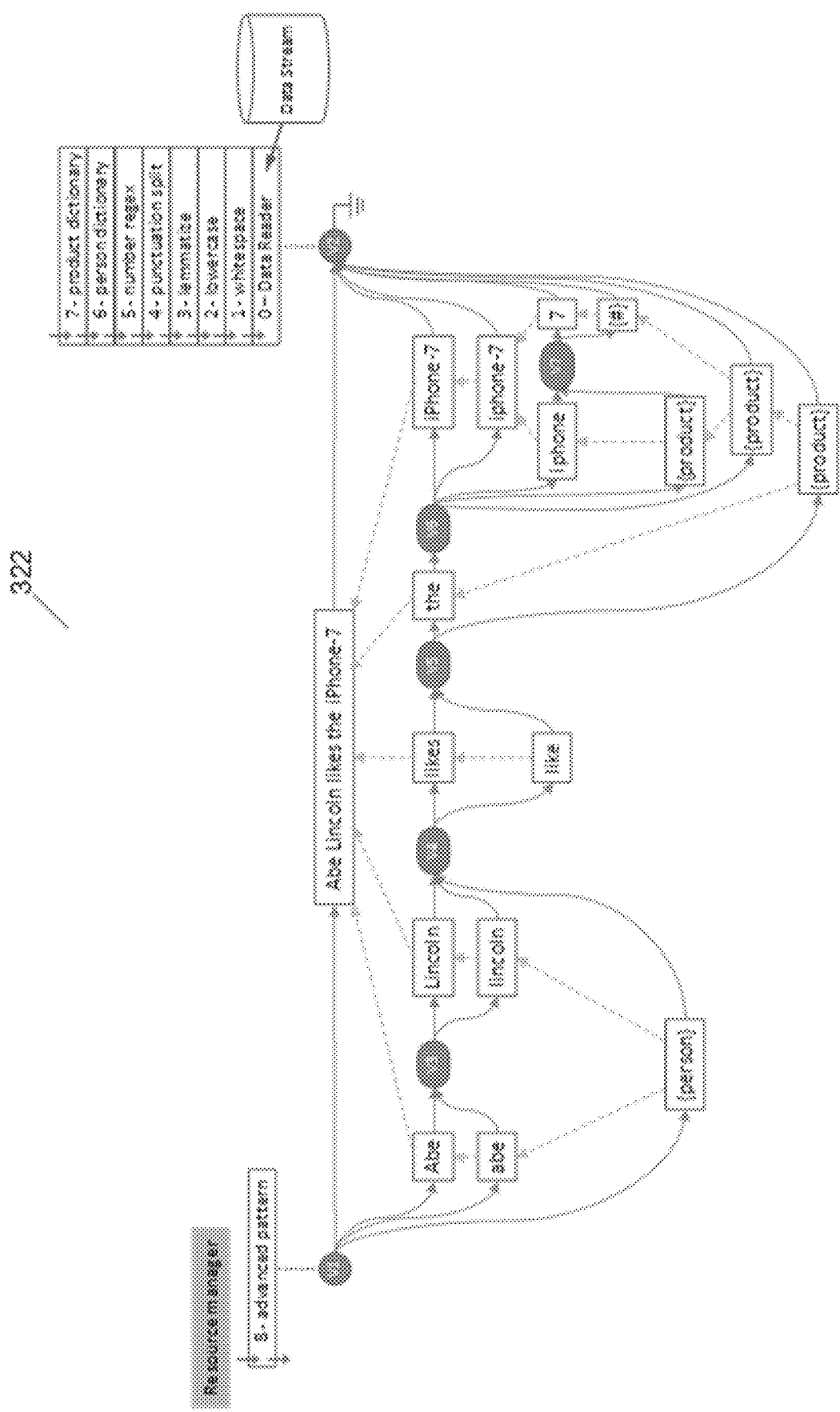

FIG. 3K illustrates a graphical representation 322. As can be seen in FIG. 3K, the advanced pattern component of the system tags a sequence of tokens and semantic tags with a semantic tag, such as the product tag based on the pattern data. As can be seen in FIG. 3K, the advanced pattern component tags the lexical item sequence "the, {product}" with the product tag.

Figure 3L:
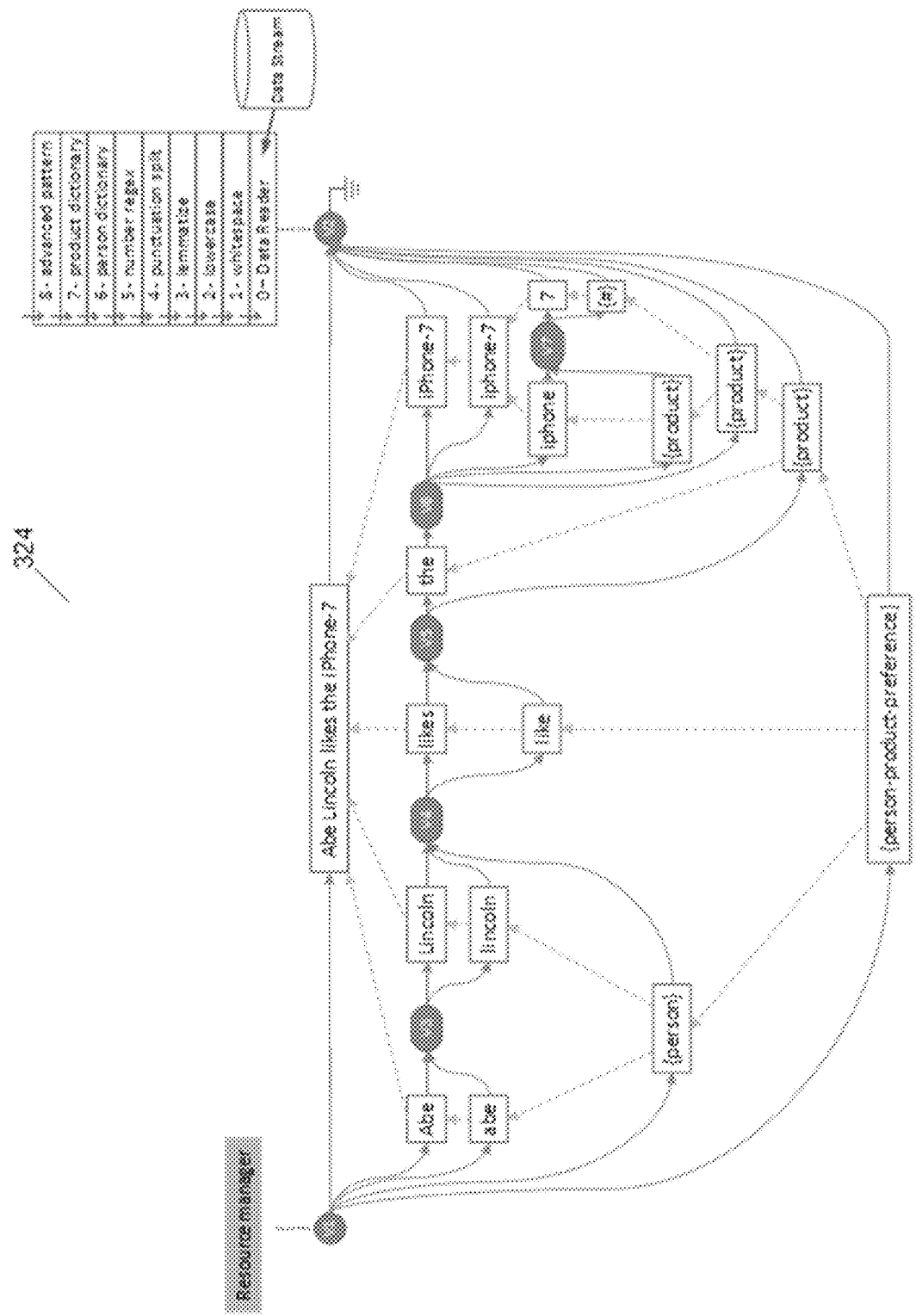

FIG. 3L illustrates a graphical representation 324. As can be seen in FIG. 3L, an advanced pattern component of the system tags a sequence of token with a semantic tag based on the pattern data. As can be seen in FIG. 3L, the advanced pattern component tags the lexical item sequence "{person}, like, {product}", made up of two semantic tags and one token, with the tag "person-product-preference". Basically, FIG. 3L illustrates an interpretation graph of the data block "Abe Lincoln likes the iPhone-7". An interpretation of the entire sentence is "person-product-preference". In other words, there's a person who likes a product. The "person" is made up of two tokens—token "abe" and token "lincoln". The token "lincoln" has a title-case alternative: "Lincoln". Further, the token "likes" has a lemmatized alternative: "like".

Figure 3M:
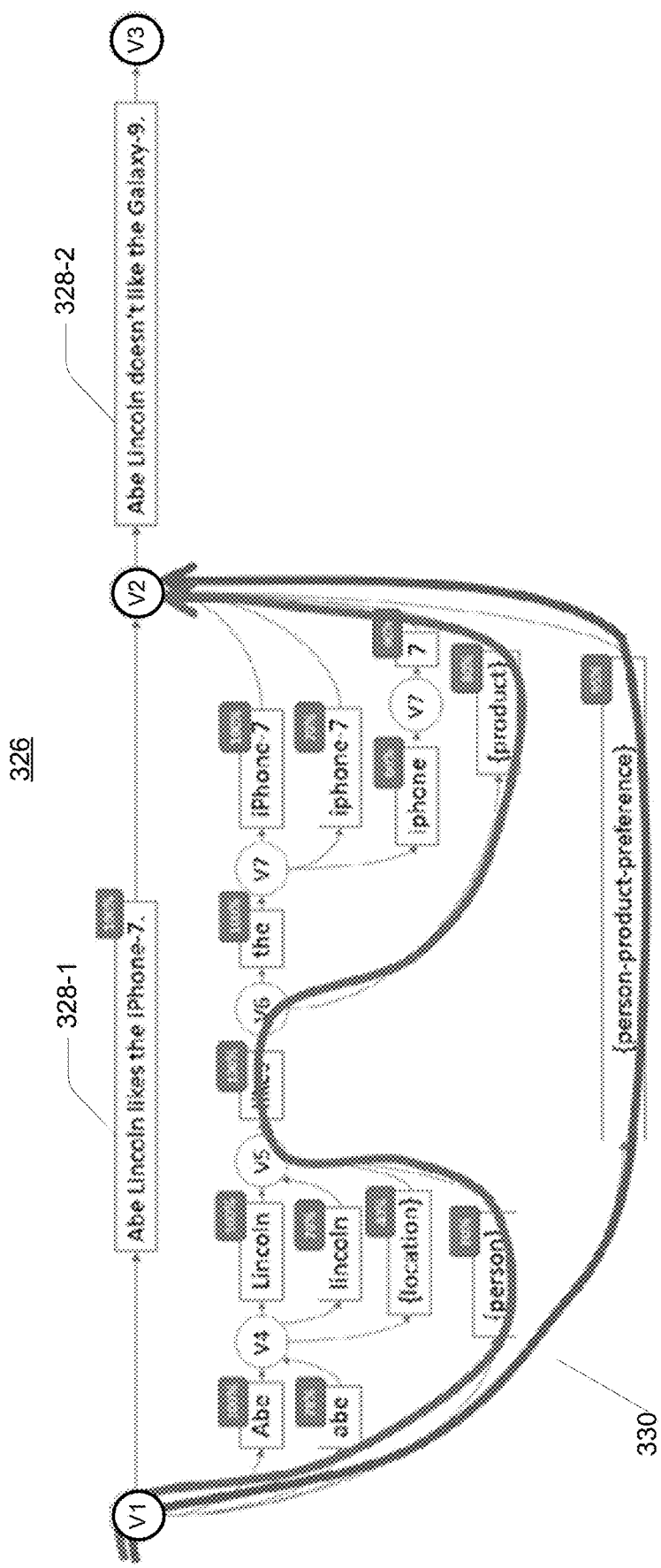

FIG. 3M illustrates a graphical representation 326 illustrating two data blocks 328-1 and 328-2. The data block 328-1 corresponds to sentence "Abe Lincoln likes the iPhone-7." And the data block 328-2 corresponds to sentence "Abe Lincoln doesn't like the Galaxy-9. The data blocks 328-1 and 328-2 are joined by vertex V2. Vertex V1 may be considered as starting point of the interpretation graph for the data stream and V3 may considered as end point/end vertex. For the sake of brevity, an interpretation graph 330 corresponding to data block 328-1 is illustrated. One of ordinary skill in the art will appreciate that a similar interpretation graph may be generated for the second data block 328-2 as well. The interpretation graph 330 may be generated as explained above in FIGS. 3A through 3L, where tokens may be generated, and various alternatives for each token may be generated, and tags may be associated with the tokens.

Further a confidence score may be associated with each lexical item (token/data block). For instance, "Abe" token has confidence score of 100% and "abe' token has confidence score "70%", indicating there is a 70% probability of this interpretation being correct. Also, as can be seen, a confidence score may be associated with tags as well. For instance, for the "Lincoln" token, the "{location}" tag has confidence score of "40%", while "{person}" tag has confidence score of "80%".

Figure 4:
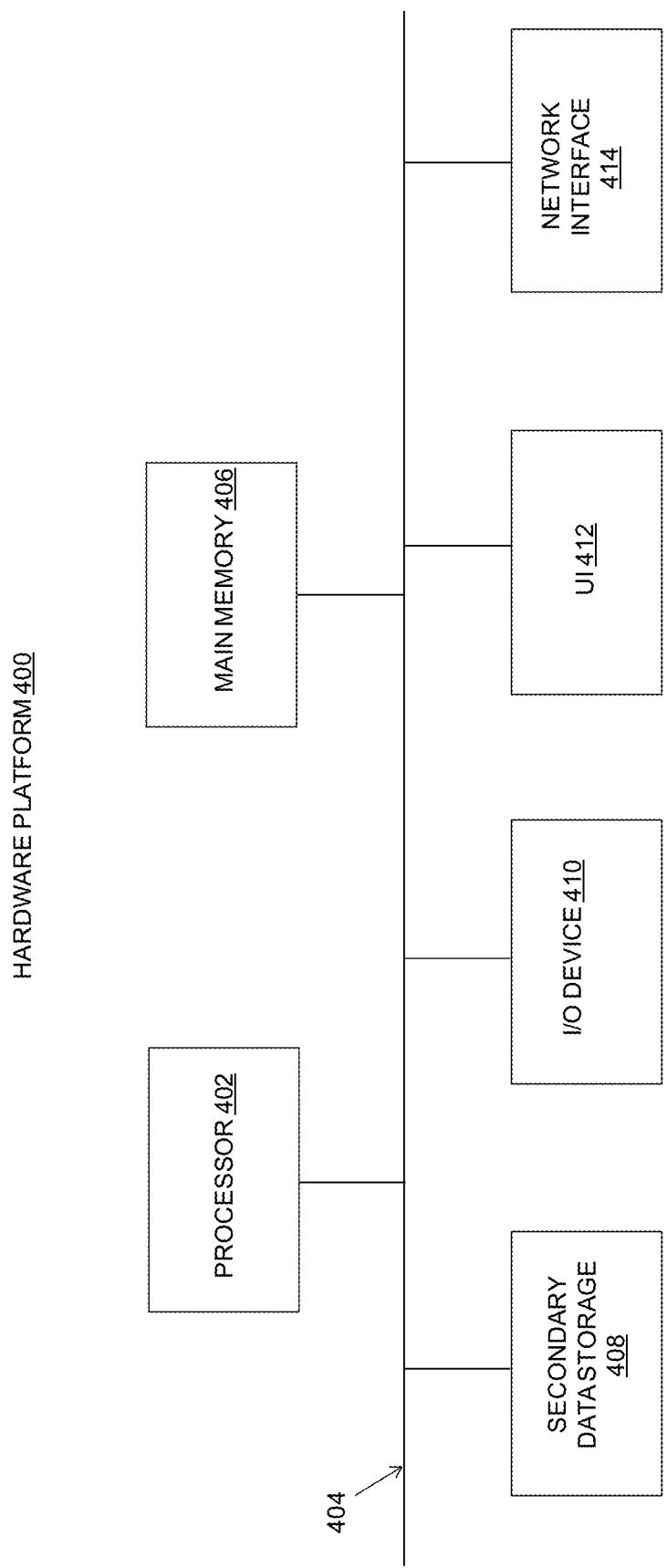
FIG. 4 illustrates a hardware platform for implementation of the system, according to an example embodiment of the present disclosure.

FIG. 4 illustrates a hardware platform 400 for implementation of the system 100, according to an example of the present disclosure. In an example embodiment, the hardware platform 400 may be a computer system 400 that may be used with the examples described herein. The computer system 400 may represent a computational platform that includes components that may be in a server or another computer system. The computer system 400 may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 400 may include a processor 402 that may implement or execute machine readable instructions performing some or all of the methods, functions, techniques and/or other processes described herein. Commands and data from the processor 402 may be communicated over a communication bus 404. The computer system 400 may also include a main memory 406, such as a random-access memory (RAM), where the machine readable instructions and data for the processor 402 may reside during runtime, and a secondary data storage 408, which may be non-volatile and stores machine readable instructions and data. The memory 406 and data storage 408 are examples of non-transitory computer readable mediums. The memory 406 and/or the secondary data storage may store data used by the system 100, such as an object repository including web objects, configuration data, test data, etc.

The computer system 400 may include an Input/Output (I/O) device 410, such as a keyboard, a mouse, a display, etc. A user interface (UI) 412 can be a communication device that provides textual and graphical user interfaces to a user of the system 100. The UI 412 may operate with I/O device 410 to accept from and provide data to a user. The computer system 400 may include a network interface 414 for connecting to a network. Other known electronic components may be added or substituted in the computer system. The processor 402 may be designated as a hardware processor. The processor 402 may execute various components of the system 100 described above and perform the methods described below.

Figure 5:
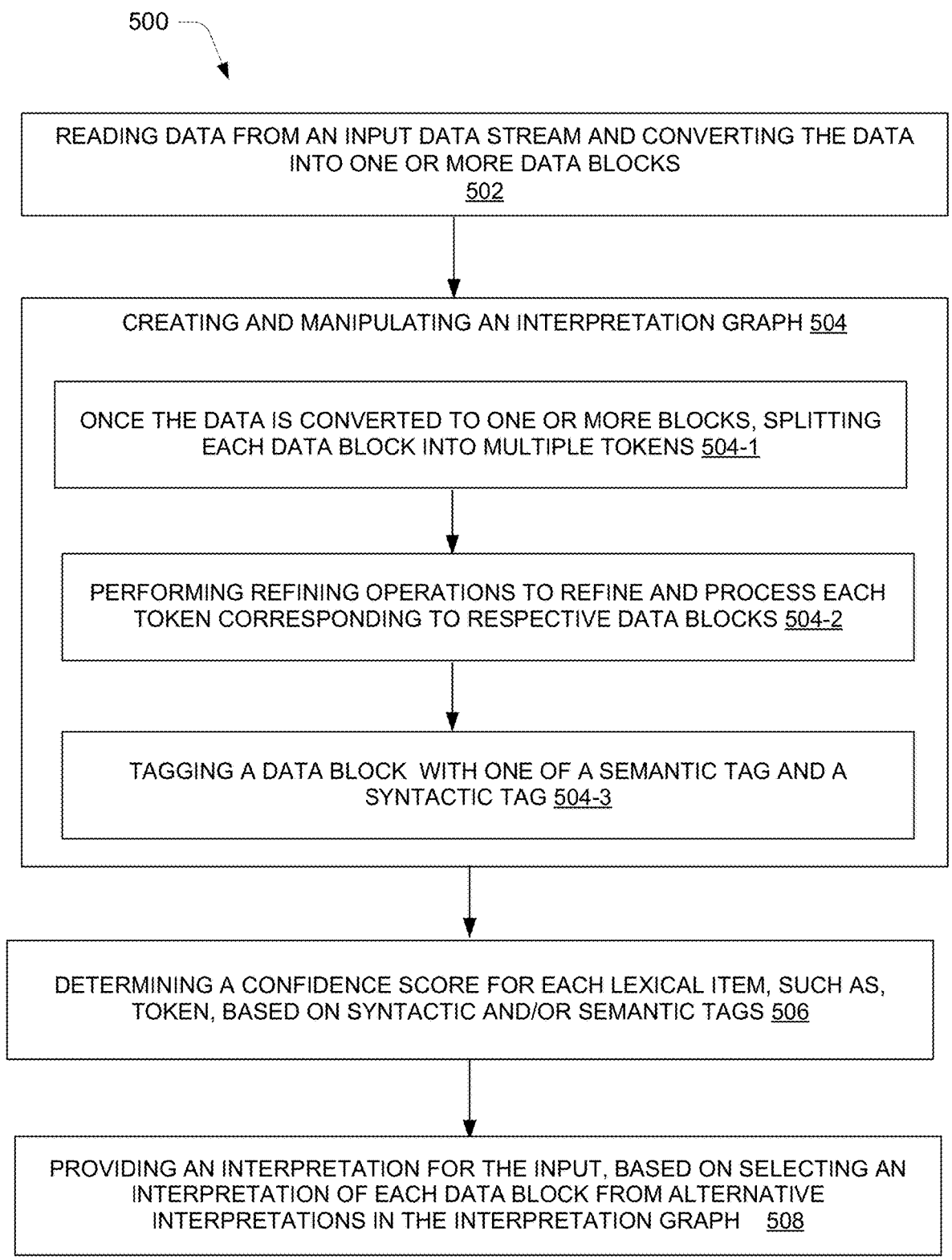
FIG. 5 illustrates a computer-implemented method depicting functionality of the system, according to an example embodiment of the present disclosure.

FIG. 5 illustrate a computer-implemented method 500 depicting functionality of the system 100, according to an example embodiment of the present disclosure. For the sake of brevity, construction and operational features of the system 100 which are explained in detail in the description of FIG. 1, FIG. 2, FIGS. 3A-3N, and FIG. 4 are not explained in detail in the description of FIG. 5.

At method block 502, the method 500 commences with reading data from a data stream and converting the data into one or more data blocks. In an example, junction points (starting point, end point, and connecting points between two lexical items) in the data stream may be identified to define vertices and accordingly data blocks may be determined. The connecting points may be predefined. For instance, if a data block is to correspond to a sentence, then punctuation marks, such as a comma, a full stop, a colon, etc. may be identified, whereas in case data block is to be paragraph, the paragraph separator may be identified. The data stream comprises raw text indicative of a natural language. In an example, the data reader 108 may convert the data in the data stream to the data blocks.

At method block 504, an interpretation graph may be created and manipulated. An initial interpretation graph may include the data blocks and the vertices corresponding to the junction points. Multiple steps may be performed for creating and manipulating the interpretation graph. Furthermore, these steps may be executed in a predefined order to modify the interpretation graph. The steps may also be executed multiple times, using augmentations from one iteration to act as inputs for a subsequent iteration. At block 504-1, once the data is converted to one or more data blocks, each data block is split into multiple tokens. In an example, tokenization techniques may be implemented using external information sources for splitting the data blocks into tokens. The external information source may be a trained machine learning based source.

At method block 504-2, each token corresponding to respective data blocks is refined and processed by performing refining operations. The refining operations include, but are not limited to, splitting each token into one or more further tokens based on a character set, normalizing each token from an uppercase form to a lowercase form, and setting a "character" flag upon determining that the token includes a character, such as a special character, a symbol, or a number. All token variations may be added to the interpretation graph as alternative interpretations.

At method block 504-3, the tokens in a data block may be tagged with one of a semantic tag and a syntactic tag based on at least one of an entity data and a pattern data to create an interpretation graph of each data block. An interpretation graph of a data block is indicative of alternative interpretations of each token of the data block. Further, in certain cases, a token may also include one or more sub-tokens, where each sub-token may also be joined via vertex. The semantic tag may include, but is not limited to, at least one of a person tag, a place tag, a food tag, a company tag, a product tag, an active object tag, a passive object tag, and a person-product-preference tag. The syntactic tag may include tags such as noun, verb, adjective as well as active object and passive object tags. An example of an active object is "The Raven kicked the football" where 'The Raven' is an active object, in other words an object taking an active role in the action. An example of a passive object is "The football was kicked by The Raven", where "The football" is an example of a passive object. In other words, the object passively receiving the action initiated by some other object.

At method block 506, a confidence score for each lexical item, such as, for example, a token or semantic and/or syntactic tag may be based on other lexical items. Referring to the example above pertaining to occurrence of term "Paris" in the data stream. Based on the criteria for determining confidence score, a confidence score may be determined for the token "Paris" based on tag "Paris, France" and then another confidence score, based on tag "Paris, Texas". The tags' scores impact the score of the lexical item by helping to determine the most likely interpretation of that item.

In an example, computations for the confidence scores may refer to other lexical items in the interpretation graph, lexical items from other data blocks, and any other external resources, such as public data, or company or application-specific data sets. For example, referring to the example above, initially for the token "Paris", the location tag "Paris, France" may be selected using population as a measure of confidence, but if the later token "Texas" is found next, the larger text block would now select the "place" tag for "Paris, Tex.", which would have a higher confidence score, based on adding the scores for the individual tokens "Paris" and "Texas".

At method block 508, an interpretation for the input is provided, based on selecting an interpretation of each data block from interpretations in the interpretation graph, which in turn is based on the confidence score associated with the lexical items. An interpretation may be a sequence of one or more lexical items of the data block. The selection of the lexical items for the interpretation may be based on a confidence score computed above, which may be computed by referring to business rules, flags, and external data. For instance, the lexical items with highest confidence score may be selected and accordingly the interpretation (path in the interpretation graph) with highest overall confidence score may be selected. The selection of the interpretation of a data block may include searching through the interpretation graph to identify the path from a first vertex to a last vertex, corresponding to a data block, with a highest overall confidence score.

Upon selecting an interpretation of each data block, the interpretation of the input may be provided. To provide an interpretation of the input data stream, the selected interpretation for the data blocks may be combined. In an example, a selected interpretation may not represent the entire data block, i.e., selection of one or more partial interpretations representing parts of the data block may be performed without departing from the scope of the disclosure.

Figure 6A:
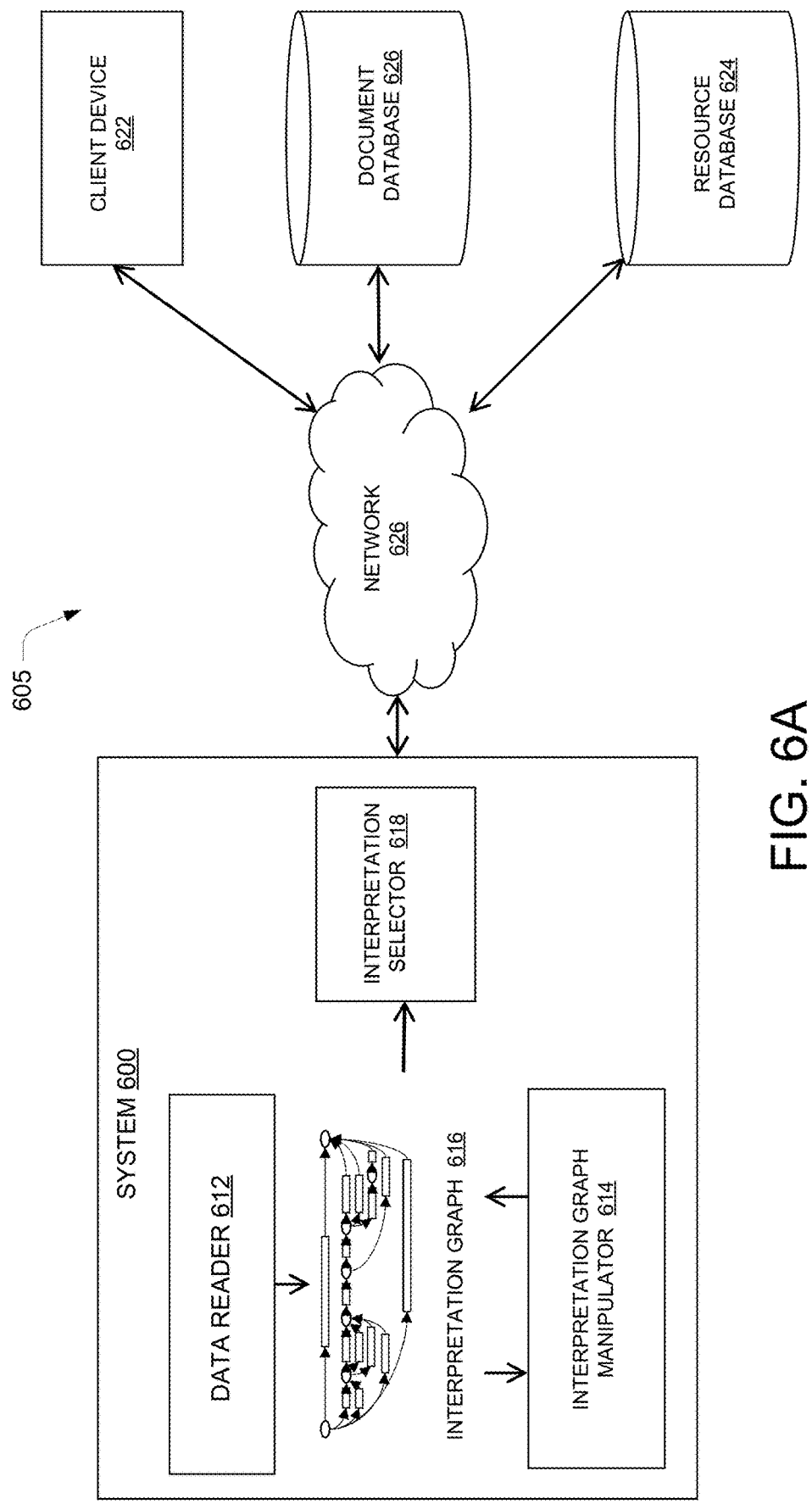
FIG. 6A and FIG. 6B illustrate block diagrams 605 and 610 corresponding to system 100, according to various examples of the present disclosure.
Figure 6B:
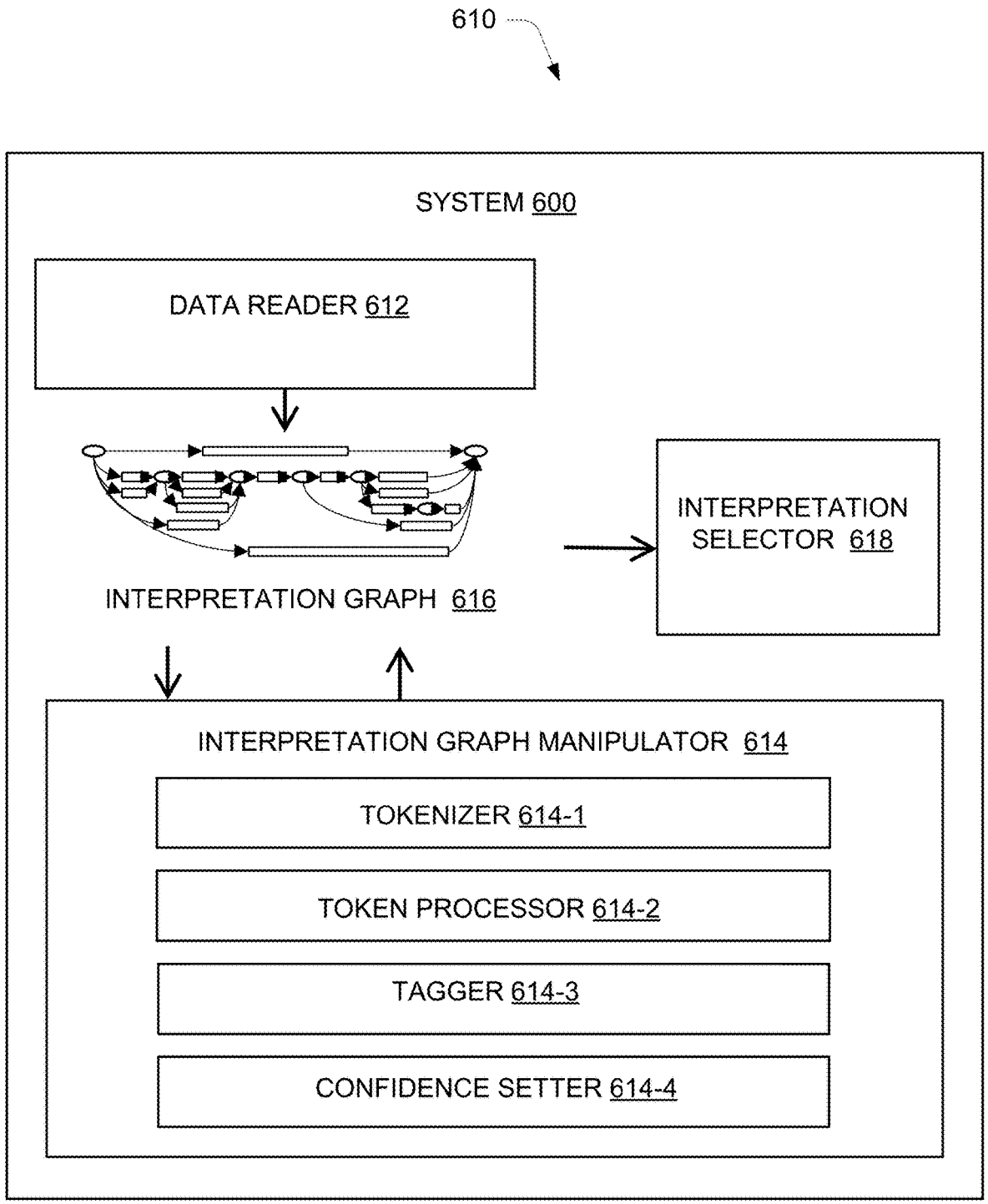

FIG. 6A and FIG. 6B illustrate block diagrams 605 and 610 corresponding to system 100, according to various examples of the present disclosure. Referring to environment 605, a system 600, similar to the system 100, is illustrated. The system 600 includes components similar or with identical functions as that of system 100. The system 600 includes a data reader 612, which may be similar to data reader 108, an interpretation graph manipulator 614 to generate an interpretation graph 616, an interpretation selector 618. The interpretation graph manipulator 614 may implement one or more functionalities of, for instance, the tokenizer 110 and the interpretation graph creator 112, and the interpretation selector 618 may implement one or more functionalities of the selector 114.

Further, the system 600 may be coupled to a client device 620, which provides the input to be processed and an external source, such as a resource database 622 and a document database 624, over a network 626. In other examples, the system 600 may not communicate with the document database 624 or the functionalities of the document database 624 may be integrated with the functionalities of the resource database.

The block diagram 610 illustrates various components of the interpretation graph manipulator 614. As illustrated, the interpretation graph manipulator 614 may include a tokenizer 614-1, which may be similar to the tokenizer 110, a token processor 614-2, which may be similar to the token processor 202, and a tagger 614-3, which may be similar to the tagger 204, and a confidence setter 614-4.

In an example, the interpretation graph 616 for providing alternative interpretations of ambiguous input represented as alternative paths through the graph is generated. The input may include at least one of human generated natural language content, a real-time input from a user, a user input from voice recognition software, an input previously authored input from an author stored into an electronic document.

The interpretation graph 616 includes vertexes which represent junction points in the input each of which can include zero or more directed arcs to zero or more lexical items and lexical items that represent alternative interpretations of ambiguous input which cover the range of input spanned by two ordered but not necessarily adjacent vertices.

The data reader 612 may receive an input indicative of a data stream and read data from the data stream and convert the data stream/data into one or more data blocks. Further, the interpretation graph manipulator 614 creates an initial interpretation graph, a simple list of data blocks joined by vertexes, data blocks being one type of lexical item. Further, the interpretation graph manipulator 614 may augment and refine the interpretation graph 616. To refine and augment, the interpretation graph manipulator 614 may perform one more functions using components from 614-1 to 614-4. For instance, the functions include creating a new lexical item, such as, a new alternative interpretation and adding it to the interpretation graph from one existing vertex to another, creating a sequence of new lexical items, each lexical item joined in order by a vertex, the entire sequence added to the interpretation graph from one existing vertex to another; or modifying the confidence levels of lexical items.

In an example, the interpretation selector 618 may select an interpretation from the interpretation graph. To select the interpretation, the interpretation selector is to compute an overall confidence score of a path through the interpretation graph 616 from one vertex to another; a search through the interpretation graph 616 which identifies the path from the first vertex to the last vertex with the highest overall confidence; and a search to identify increasingly less likely interpretations, above a specified threshold.

In an example, the lexical items may include tokens derived from the data blocks using tokenization algorithms, for instance, splitting arrays of characters into words or tokens. The lexical items may also include, for instance, tokens derived from one or more other tokens, syntactic elements derived from other lexical items including but not limited to the tokens and other previously identified syntactic elements, and/or semantic elements derived from other lexical items including but not limited to words, names, actions and other semantic elements.

Further, lexical item derivation, such as the token derivation, syntactic element derivation, and semantic element derivation may be based on external resources, such as, dictionaries and lists. The external resource may be a trained machine learning model, such as a neural network. The syntactic elements may be parts of speech such as noun, verb, adjective, etc., sentence structure including but not limited to phrases, subordinate clauses, subject, object, modifier phrases, etc.

In an example, the confidence setter 614-4 may aid in determining a confidence score associated with a lexical item. The confidence score may be a floating point number, a multi-dimensional vector, or any complex data structure. The complex data structure may represent a formula for computing the confidence level based on the confidence levels of other lexical items. For instance, the confidence of a semantic tag may be a formula based on the lexical items, which are combined together to make up the tag. The formula may also include external factors, such as the popularity of a lexical item from an external database. For example, |trump| likely refers to "Donald Trump, 45th President of the United States" over "Donald Trump, oncologist from Falls Church Virginia".

In an example, the external database may include semantic information about the lexical item and the confidence factor is determined based on how well the external semantic information matches internal contextual information of the interpretation and other alternative interpretations. For instance, Michael Phelps, basketball player| is more likely to refer to "Mike Phelps", the LA Clippers player than "Michael Phelps" the Olympic swimmer or "Michael E. Phelps" the Positron Emission Tomography author.

As mentioned earlier, an interpretation may be selected, based on a confidence score associated with a lexical item. In an example, the computation of confidence for any lexical item is expressed as an optimization formula, which is computed using a quantum computer. In another example, the computation of confidence for any lexical item is based on an output of predictive algorithms trained from prior examples using machine learning including but not limited to neural networks.

The determination of the best interpretation from the interpretation graph 616 may be expressed as an optimization formula, which may be computed using a quantum computer. Further, interpretation graph manipulator 614 to augment the interpretation graph may use parallel processing with many threads or machines operating on the same interpretation graph at the same time. In another example, augmenting of the interpretation graph 616 may include, executing the same function or a set of functions multiple times until no further additions or changes to the interpretation graph are performed by those functions.

Figure 7:
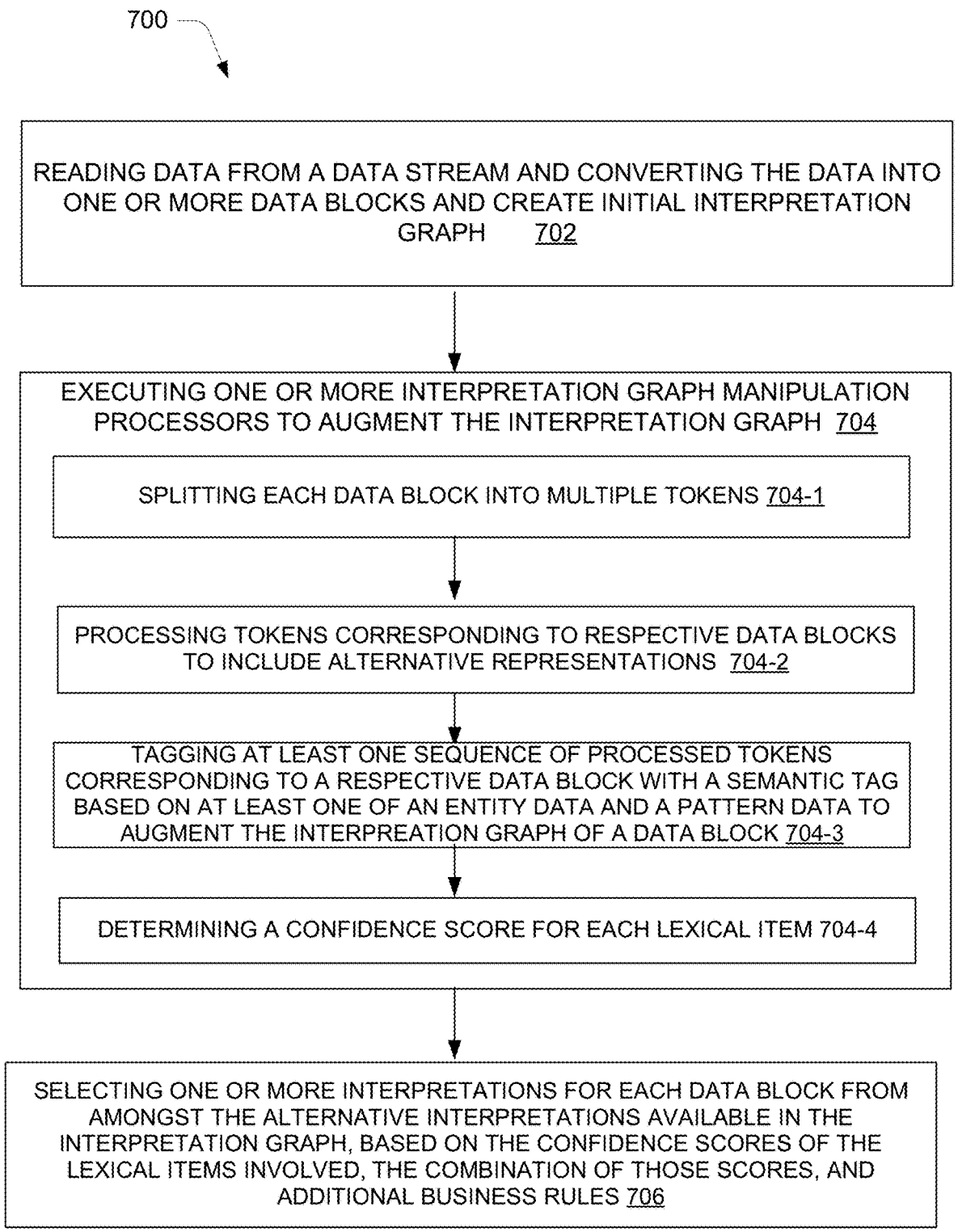
FIG. 7 illustrates a method for generating an interpretation graph, according to an example of the present disclosure.

FIG. 7 illustrates a method 700 for processing an input to generate an interpretation graph, according to an example of the present disclosure. The method 700 may be performed by the system 100, 600.

At block 702, data from a data stream is read and the data/data stream is converted into one or more data blocks to create initial interpretation graph.

At block 704, one or more interpretation graph manipulation functions may be executed to augment the interpretation graph. For instance, at block 704-1, each data block may be split into multiple tokens. At block 704-2, tokens corresponding to respective data blocks may be processed to include alternative representations (case, word variations, additional splits on punctuation, etc.). At block 704-3, at least one sequence of processed tokens corresponding to a respective data block may be tagged with a semantic tag based on at least one of an entity data and a pattern data to augment the interpretation graph of a data block, where an interpretation graph of a data block is indicative of alternative interpretations of token and semantic tags of the data block, and where the at least one sequence of processed tokens includes one or more processed tokens. At block 704-4, a confidence score for each lexical item may be determined.

At block 706, one or more interpretations for each data block from amongst the alternative interpretations available in the interpretation graph may be selected based on the confidence scores of the lexical items involved, the combination of those scores, and additional predetermined rules, such as business rules.

What has been described and illustrated herein are examples of the present disclosure. The terms, descriptions and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

What is claimed is:

1. A system comprising:
    a processor;
    a data reader coupled to the processor to:
        receive an input indicative of a data stream; and
        convert the data stream into one or more data blocks, each data block representing a logical division of content from the data stream;
    a tokenizer coupled to the processor to split the one or more data blocks into a plurality of tokens using tokenization techniques;
    an interpretation graph creator coupled to the processor to:
        create an interpretation graph providing alternative interpretations of at least one of each token and a sequence of tokens of the one or more data blocks, an alternative interpretation being represented as a path through the interpretation graph, wherein the interpretation graph includes lexical items connected by vertices to define the path, a vertex representing a junction point between two lexical items; and
        augment the interpretation graph by performing at least one of:
            determining a confidence score for each of the lexical items based on at least one of a tag associated with a lexical item, external data, and a predetermined rule; and
            modifying the confidence score associated with each of the lexical items; and
    a selector coupled to the processor to select the alternative interpretation from the interpretation graph, based on an overall confidence score for the path corresponding to each of the alternative interpretations in the interpretation graph.

2. The system of claim 1, wherein the data reader is to create an initial interpretation graph comprising the one or more data blocks joined by the vertices, and the interpretation graph is created based on the initial interpretation graph.

3. The system of claim 1, wherein the interpretation graph creator is to further augment the interpretation graph by performing at least one of:
    creating a new lexical item and adding the new lexical item to the interpretation graph from one existing vertex from the vertices to another vertex in the vertices; and
    creating a sequence of new lexical items, each lexical item in the sequence being joined in an order by the vertex, wherein the sequence is added to the interpretation graph from one existing vertex from the vertices to another vertex in the vertices.

4. The system of claim 1, wherein the lexical item includes a Boolean flag, the Boolean flag corresponding to values of "set" and "unset".

5. The system of claim 1, wherein the lexical items include at least one of tokens derived from one or more other tokens, syntactic elements derived from other lexical items, and semantic elements derived from the other lexical items.

6. The system of claim 5, wherein the tokens, the syntactic elements, and the semantic elements are derived based on an external resource, the external source including at least one of:
    a database of patterns indicating sequences of lexical items combined together to derive other lexical items; and
    a neural network indicating sequences of lexical items combined together to derive the other lexical items.

7. The system of claim 1, wherein the selector is to:
    compute the overall confidence score for the path in the interpretation graph from one vertex to another; and
    search through the interpretation graph to identify the path from a first vertex to a last vertex with a highest overall confidence score to select the alternative interpretation.

8. The system of claim 7, wherein the computation of the overall confidence score is based on at least one of:
    a predefined rule, the predefined rule being based on the confidence score of other lexical items;
    an external database including semantic information pertaining to a corresponding lexical item, wherein the confidence factor is determined based on how well the external semantic information matches internal contextual information of an interpretation and other alternative interpretations;
    an optimization formula computed using a quantum computer; and
    an output of a predictive algorithm trained using machine learning techniques.

9. The system of claim 1, wherein the interpretation graph creator to augment the interpretation graph is to:
    execute one of a pipeline and a sequence of processing functions executed in a sequential order; and
    execute one of a same function and a set of functions multiple times until no further modifications to the interpretation graph are performed by the functions.

10. The system of claim 1, wherein the confidence score is one of a floating point number, a multi-dimensional vector, and a complex data structure.

11. The system of claim 1, wherein the confidence score is determined based on an end user's location.

12. A method comprising:

receiving an input indicative of a data stream;

converting the data stream into one or more data blocks, each data block representing a logical division of content from the data stream;

splitting the one or more data blocks into a plurality of tokens using tokenization techniques;

creating an interpretation graph providing alternative interpretations of at least one of each token and a sequence of tokens of the one or more data blocks, an alternative interpretation being represented as a path through the interpretation graph, wherein the interpretation graph includes lexical items connected by vertices to define the path, a vertex representing a junction point between two lexical items;

augmenting the interpretation graph by performing at least one of:

determining a confidence score for each of the lexical items based on at least one of a tag associated with a lexical item, external data, and a predetermined rule; and modifying the confidence score associated with each of the lexical items; and selecting the alternative interpretation from the interpretation graph for the input, based on an overall confidence score for the path corresponding to each of the alternative interpretations in the interpretation graph.

13. The method of claim 12, wherein the lexical item includes a Boolean flag, the Boolean flag corresponding to values of "set" or "unset".

14. The method of claim 12, wherein the method further comprises creating an initial interpretation graph comprising the one or more data blocks joined by the vertices, and wherein the interpretation graph is based on the initial interpretation graph.

15. The method of claim 12, wherein augmenting the interpretation graph further comprises performing at least one of:

creating a new lexical item and adding the new lexical item to the interpretation graph from one existing vertex from the vertices to another vertex in the vertices; and creating a sequence of new lexical items, each lexical item in the sequence being joined in an order by the vertex, wherein the sequence is added to the interpretation graph from one existing vertex from the vertices to another vertex in the vertices.

16. The method of claim 12, wherein augmenting further comprises:

executing one of a pipeline and a sequence of processing functions executed in a sequential order; and executing one of a same function and a set of functions multiple times until no further modifications to the interpretation graph are performed by the functions.

17. The method of claim 12, wherein the lexical items include at least one of tokens derived from one or more other tokens, syntactic elements derived from other lexical items, and semantic elements derived from the other lexical items, the tokens, the syntactic elements, and the semantic elements being derived, based on an external resource, the external source including at least one of:

a database of patterns indicating sequences of lexical items combined together to derive other lexical items; and a neural network indicating sequences of lexical items which are combined together to derive the other lexical items.

18. The method of claim 12 wherein selecting further comprises:

computing the overall confidence score for the path in the interpretation graph from one vertex to another, based on the confidence score of the lexical items in the path; and searching through the interpretation graph to identify the path from a first vertex to a last vertex with a highest overall confidence score to select the alternative interpretation.

19. The method of claim 12, wherein the confidence score is determined based on an end user's location.

20. A non-transitory computer readable medium including machine readable instructions that are executable by a processor to:

receive an input indicative of a data stream;

convert the data stream into one or more data blocks, each data block representing a logical division of content from the data stream;

split the one or more data blocks into a plurality of tokens using tokenization techniques;

create an interpretation graph providing alternative interpretations of at least one of each token and a sequence of tokens of the one or more data blocks, an alternative interpretation being represented as a path through the interpretation graph, wherein the interpretation graph includes lexical items connected by vertices to define the path, a vertex representing a junction point between two lexical items;

augment the interpretation graph by performing at least one of:

determine a confidence score for each of the lexical items based on at least one of a tag associated with a lexical item, external data, and a predetermined rule; and modify the confidence score associated with each of the lexical items; and select the alternative interpretation from the interpretation graph for the input, based on an overall confidence score for the path corresponding to each of the alternative interpretations in the interpretation graph.

* * * * *